(12) United States Patent
Nonogaki et al.

(10) Patent No.: US 9,597,891 B2
(45) Date of Patent: Mar. 21, 2017

(54) INKJET INK, METHOD OF MANUFACTURING INKJET INK, INK CARTRIDGE, AND INKJET RECORDING DEVICE

(71) Applicants: Masayasu Nonogaki, Shizuoka (JP); Mitsuru Naruse, Shizuoka (JP); Akihiko Matsuyama, Shizuoka (JP); Keita Katoh, Shizuoka (JP); Kazukiyo Nagai, Shizuoka (JP); Yuusuke Koizuka, Shizuoka (JP)

(72) Inventors: Masayasu Nonogaki, Shizuoka (JP); Mitsuru Naruse, Shizuoka (JP); Akihiko Matsuyama, Shizuoka (JP); Keita Katoh, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 14/674,361

(22) Filed: Mar. 31, 2015

(65) Prior Publication Data

US 2015/0307734 A1    Oct. 29, 2015

(30) Foreign Application Priority Data

Apr. 24, 2014  (JP) .................................. 2014-090291
Dec. 25, 2014  (JP) .................................. 2014-261711

(51) Int. Cl.
*B41J 2/21*     (2006.01)
*C09D 143/02*   (2006.01)
*C09D 139/06*   (2006.01)

(52) U.S. Cl.
CPC .......... *B41J 2/2107* (2013.01); *C09D 139/06* (2013.01); *C09D 143/02* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 9,028,056 B1 | 5/2015 | Naruse et al. | |
| 2012/0176455 A1* | 7/2012 | Ohta | B41M 5/0011 347/102 |

(Continued)

FOREIGN PATENT DOCUMENTS

| | | |
|---|---|---|
| JP | 2011-122072 | 6/2011 |
| JP | 2014-173080 | 9/2014 |
| JP | 2014-173081 | 9/2014 |

OTHER PUBLICATIONS

U.S. Appl. No. 14/676,168, filed Apr. 1, 2015 Inventor : Katoh, et al.

(Continued)

*Primary Examiner* — Manish S Shah
(74) *Attorney, Agent, or Firm* — Oblon, McClelland, Maier & Neustadt, L.L.P.

(57) ABSTRACT

An inkjet ink contains water, a hydrosoluble organic solvent, a pigment, polyvinyl pyrolidone, and a copolymer, wherein the copolymer contains a structure unit represented by Chemical formula 1, (Continued)

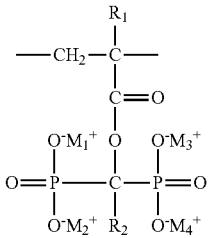

Chemical formula 1 where $R_1$ represents a hydrogen atom or a methyl group, $R_2$ is an alkyl group having one to four carbon atoms, $M_1^+$, $M_2^+$, $M_3^+$, and $M_4^+$ each, independently represent protons, alkali metal ions, or organic ammonium ions, and a structure unit represented by Chemical formula 2,

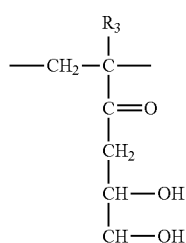

Chemical formula 2 where $R_3$ represents a hydrogen atom or a methyl group,
a structure unit represented by Chemical formula 3,

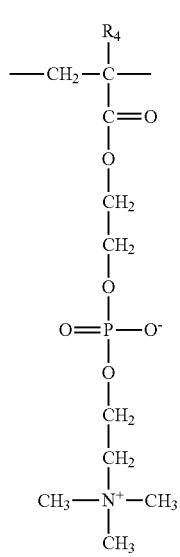

Chemical formula 3 where $R_4$ represents a hydrogen atom or a methyl group, or
a structure unit represented by Chemical formula 4,

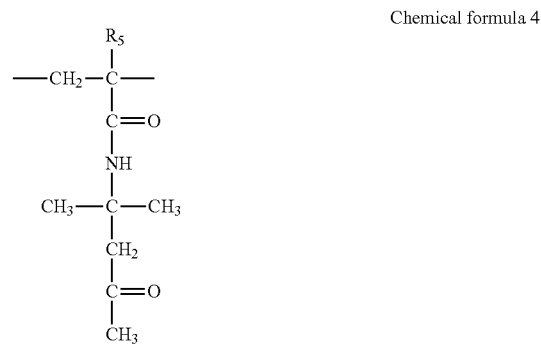

Chemical formula 4 where $R_5$ represents a hydrogen atom or a methyl group.

10 Claims, 3 Drawing Sheets

(58) Field of Classification Search
CPC .... B41J 2/1755; B41J 2/2114; B41J 11/0015;
B41J 11/002; B41J 2/2056; B41J 2/21;
B41J 2/0057; B41J 3/60; C09D 11/36;
C09D 11/40; C09D 11/30; C09D 11/38;
C09D 11/322; C09D 11/328; C09D
11/101; C09D 11/005; C09D 11/54;
C09D 11/52; B41M 5/0011; B41M
5/0017; B41M 7/00; B41M 7/0072;
B41M 5/52; B41M 5/5218
USPC .................................. 347/95–105
See application file for complete search history.

(56) References Cited

U.S. PATENT DOCUMENTS

| | | |
|---|---|---|
| 2012/0242741 A1 | 9/2012 | Hasegawa et al. |
| 2012/0328854 A1 | 12/2012 | Matsuyama et al. |
| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |

OTHER PUBLICATIONS

U.S. Appl. No. 14/505,667, filed Oct. 3, 2014.
U.S. Appl. No. 14/524,189, filed Oct. 27, 2014.

\* cited by examiner

INKJET INK, METHOD OF MANUFACTURING INKJET INK, INK CARTRIDGE, AND INKJET RECORDING DEVICE

CROSS-REFERENCE TO RELATED APPLICATIONS

This patent application is based on and claims priority pursuant to 35 U.S.C. §119(a) to Japanese Patent Application Nos. 2014-090291 and 2014-261711, filed on Apr. 24, 2014 and Dec. 25, 2014, respectively, in the Japan Patent Office, the entire disclosures of which are hereby incorporated by reference herein.

BACKGROUND

Technical Field

The present invention relates to an inkjet ink, a method of manufacturing an inkjet ink, an ink cartridge, and an inkjet recording device.

Background Art

Since inkjet recording is advantageous as image forming method in that the process is simple and full colorization is easy, the inkjet recording has been diffusing.

In inkjet recording, images are formed on a recording medium by firing a small amount of ink upon application of a pressure generated by foams generated by heat, piezoelectric, electrostatic force, etc. to attach the ink onto the recording medium such as plain paper and coated paper for printing. The utilization of inkjet recording spreads to printers or printing for personal use or industrial use.

In the inkjet recording device, an aqueous dye ink which uses a hydrosoluble dye as a colorant is commonly used. In general, such aqueous dye inks have low weatherability and water resistance. For this reason, aqueous pigment inks, which use hydroinsoluble pigments instead of hydrosoluble dyes, have been researched.

However, the aqueous pigment ink is inferior about ejection stability and storage stability.

In addition, as the technologies for producing quality images by printers for office use are improved, the aqueous pigment ink is demanded to have a good level of image density on plain paper.

However, the aqueous pigment ink involves a problem that the image density lowers because the pigment permeates into plain paper.

SUMMARY

According to the present disclosure, provided is an improved inkjet ink which contains water, a hydrosoluble organic solvent, a pigment, polyvinyl pyrolidone, and a copolymer, wherein the copolymer contains a structure unit represented by Chemical formula 1, Chemical formula 1

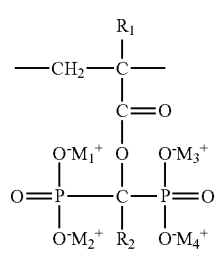

where $R_1$ represents a hydrogen atom or a methyl group, $R_2$ is an alkyl group having one to four carbon atoms, $M_1^+$, $M_2^+$, $M_3^+$, and $M_4^+$ each, independently represent protons, alkali metal ions, or organic ammonium ions, and a structure unit represented by Chemical formula 2, Chemical formula 2

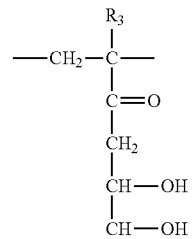

where $R_3$ represents a hydrogen atom or a methyl group, a structure unit represented by Chemical formula 3, Chemical formula 3

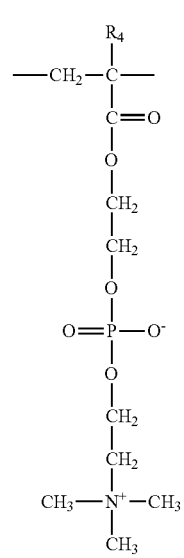

where $R_4$ represents a hydrogen atom or a methyl group, or a structure unit represented by Chemical formula 4, Chemical formula 4

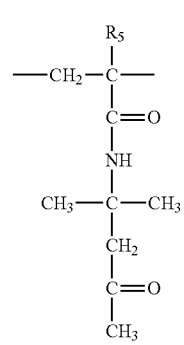

where $R_5$ represents a hydrogen atom or a methyl group.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
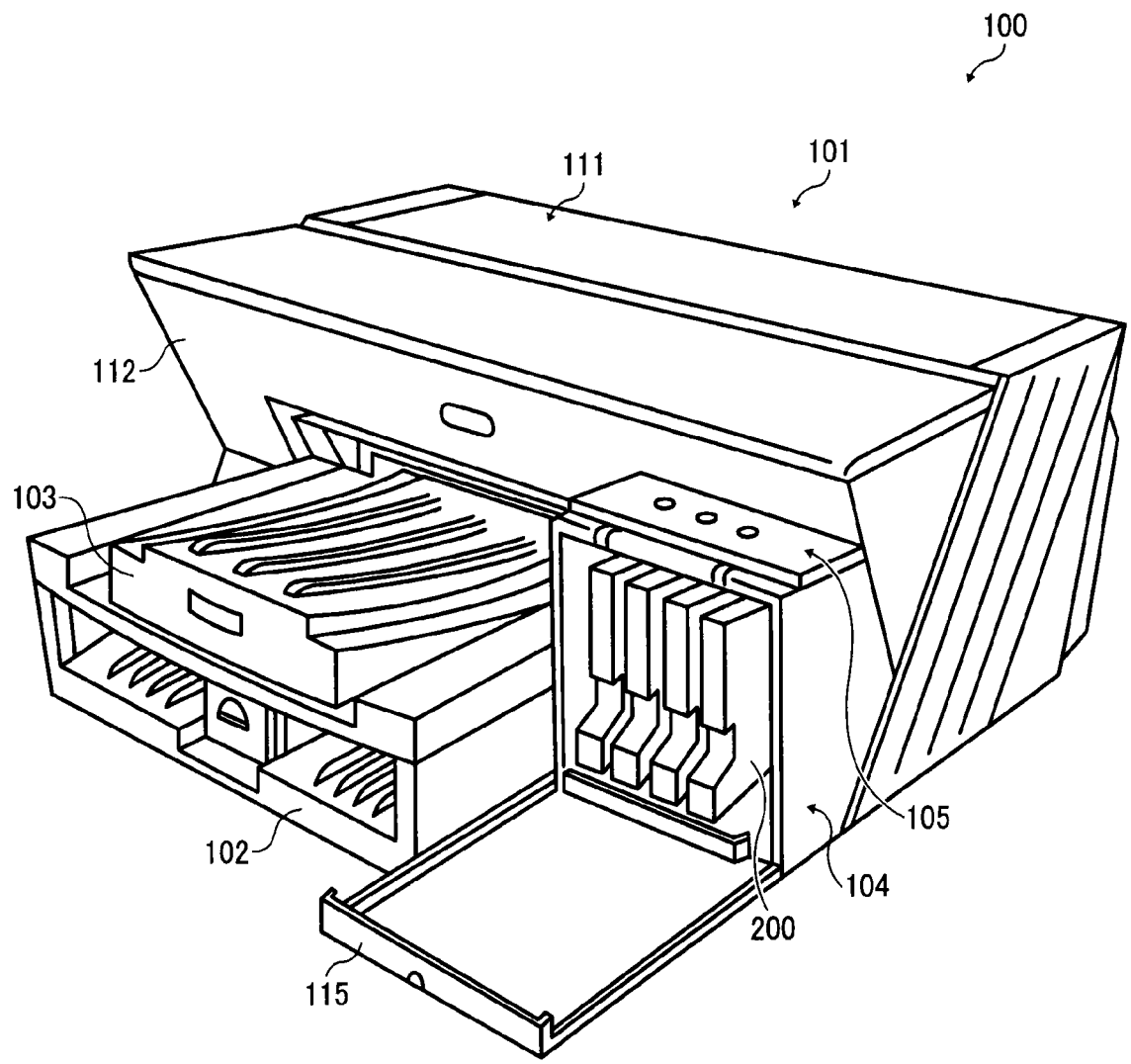
FIG. 1 is a perspective view illustrating an example of the inkjet recording device according to an embodiment of the present disclosure.

According to the present disclosure, provided is an inkjet ink having high image density on plain paper, storage stability, and ejection stability.

Embodiments of the present disclosure are described with reference to accompanying drawings.

An embodiment of the present disclosure is an inkjet ink that contains water, a hydrosoluble organic solvent, a pigment, polyvinyl pyrolidone, and a copolymer, wherein the copolymer comprises a structure unit represented by Chemical formula 1,

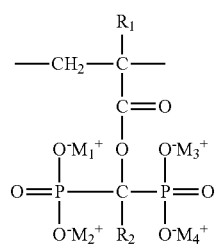

Chemical formula 1 where $R_1$ represents a hydrogen atom or a methyl group, $R_2$ is an alkyl group having one to four carbon atoms, $M_1^+$, $M_2^+$, $M_3^+$, and $M_4^+$ each, independently represent protons, alkali metal ions, or organic ammonium ions, and a structure unit represented by Chemical formula 2,

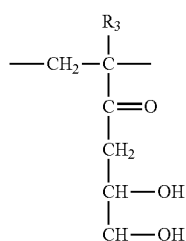

Chemical formula 2 where $R_3$ represents a hydrogen atom or a methyl group, a structure unit represented by Chemical formula 3,

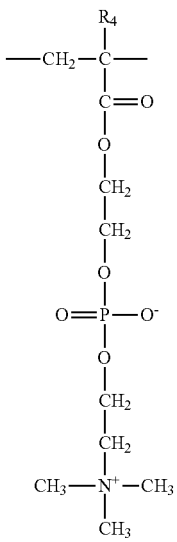

Chemical formula 3 where $R_4$ represents a hydrogen atom or a methyl group, or a structure unit represented by Chemical formula 4,

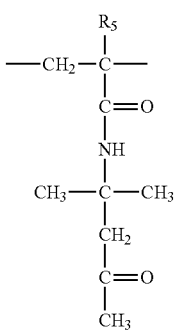

Chemical formula 4 where $R_5$ represents a hydrogen atom or a methyl group.

The inkjet ink contains water, a hydrosoluble organic solvent, a pigment, polyvinyl pyrolidone, and a copolymer. The copolymer has a structure unit represented by Chemical formula 1 and a structure unit represented by Chemical formula 2, Chemical formula 3, or Chemical formula 4.

If an inkjet ink is attached onto plain paper, multivalent metal ions (calcium ion in particular) contained in the plain paper agglomerate as a result of reaction with the copolymer, so that permeation of the pigment into paper can be subdued. Accordingly, the image density is increased.

The structure unit represented by Chemical formula 1 is hydrophilic but becomes hydrophobic by bonding with multivalent metal ions (calcium ion in particular). Therefore, if an image is formed on paper containing a multivalent hydrosoluble metal salt by using an inkjet ink containing a polymer having a structure unit represented by Chemical formula 1, the structure unit represented by Chemical formula 1 becomes hydrophobic due to the multivalent metal ion eluted from the paper to the inkjet ink, so that the multivalent metal ion agglomerates together with the pigment. As a consequence, the pigment stays on the surface of the paper, thereby increasing the image density.

However, the multivalent metal salt contained in plain paper is generally calcium carbonate, which is never or little soluble in water. Naturally, the amount of the calcium ion eluted to the inkjet ink is small. For this reason, it is not possible to increase the image density for plain paper by simply using the polymer having the structure unit represented by Chemical formula 1.

If the content of the structure unit represented by Chemical formula 1 in the polymer is increased, the mutual action between the phosphonic acid groups is increased so that the polymer becomes gelated, which is considered to lower the storage stability of the inkjet ink. This phenomenon is significant when a hydrosoluble organic solvent is contained in the inkjet ink. Therefore, the content of the structure unit represented by Chemical formula 1 in the polymer is conventionally less than 20% by weight.

For this reason, a copolymer having the structure unit represented by Chemical formula 1 and a structure unit represented by Chemical formula 2, Chemical formula 3, or Chemical formula 4 is used in order to increase hydrophilicity of the copolymer to a pigment, improve agglomeration thereof together with the pigment, and ameliorate the storage stability of an inkjet ink containing a large amount of hydrosoluble organic solvent.

In addition, this copolymer is not easily gelated so that the content of the structure unit represented by Chemical formula 1 can be increased and in addition, the reactivity of the multivalent metal ion (calcium ion in particular) is improved.

Therefore, the image density on plain paper that contains a small amount of hydrosoluble multivalent metal salts can be improved.

The copolymer can be used as pigment dispersant or additive. It is preferable to use it as pigment dispersant. By this feature, it is possible to further improve the image density on plain paper, storage stability, and ejection stability.

There is no specific limit to the selection of alkali metal ions for $M_1^+$, $M_2^+$, $M_3^+$, and $M_4^+$ of Chemical formula 1. Specific examples thereof include, but are not limited to, lithium ion, sodium ion, and potassium ion.

Organic amines deprotonized from organic ammonium ions of $M_1^+$, $M_2^+$, $M_3^+$, and $M_4^+$ of Chemical formula 1 have no particular limit and can be, for example, alkyl amines such as monomethyl amine, dimethyl amine, trimethyl amine, monoethyl amine, diethyl amine, and triethyl amine; alcohol amines such as ethanol amine, diethanol amine, triethanol amine, methyl ethanol amine, methyl diethanol amine, dimethyl ethanol amine, monopropanol amine, dipropanol amine, tripropanol amine, isopropanol amine, trishydroxy methyl aminomethane, and 2-amino-2-ethyl-1,3-propane diol; and cyclic amines such as choline, morpholine, N-methylmorpholine, N-methyl-2-pyrolidone, and 2-pyrolidone.

Specific examples of organic ammonium ions of $M_1^+$, $M_2^+$, $M_3^+$, and $M_4^+$ of Chemical formula 1 include, but are not limited to, tetramethyl ammonium ion, tetraethyl ammonium ion, and tetrabutyl ammonium ion.

The copolymer can be synthesized by copolymerizing at least monomers of a compound represented by Chemical formula 5,

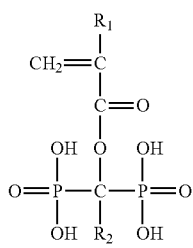

Chemical formula 5 where $R_1$ represents a hydrogen atom or a methyl group and $R_2$ is an alkyl group having one to four carbon atoms and a compound represented by Chemical formula 6,

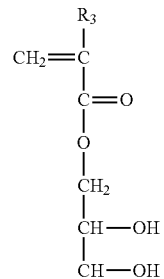

Chemical formula 6 where $R_3$ represents a hydrogen atom or a methyl group, a compound represented by Chemical formula 7,

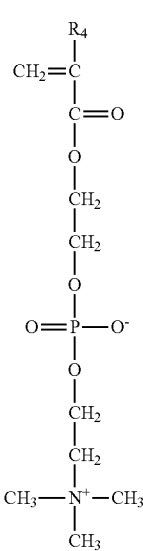

Chemical formula 7 where $R_4$ represents a hydrogen atom or a methyl group, or a compound represented by Chemical formula 8

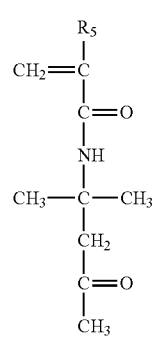

Chemical formula 8 where $R_5$ represents a hydrogen atom or a methyl group, followed by optional neutralization by an alkali metal salt group and/or an organic amine salt group.

The alkali metal salt ion has no particular limit and can be, for example, alkali metal hydroxides such as lithium hydroxide, sodium hydroxide, and potassium hydroxide. These can be used alone or in combination.

The organic amine salt group has no particular limit and can be, for example, alkyl amines such as monomethyl amine, dimethyl amine, trimethyl amine, monoethyl amine, diethyl amine, and triethyl amine; alcohol amines such as ethanol amine, diethanol amine, triethanol amine, methyl ethanol amine, methyl diethanol amine, dimethyl ethanol amine, monopropanol amine, dipropanol amine, tripropanol amine, isopropanol amine, trishydroxy methyl aminomethane, and 2-amino-2-ethyl-1,3-propane diol; cyclic amines such as choline, morpholine, N-methylmorpholine, N-methyl-2-pyrolidone, and 2-pyrolidone; organic ammonium hydroxides such as tetramethyl ammonium hydroxide, tetraethyl ammonium hydroxide, and tetrabutyl ammonium hydroxide. These can be used alone or in combination.

Of these, in terms of storage stability and ejection stability of an inkjet ink, organic amine salt groups are preferable. In particular, alcohol amines such as ethanol amine and dimethyl ethanol amine are preferable.

The copolymer is preferably neutralized with a neutralization ratio of 50% or more and, particularly preferably, 100%. By this neutralization, it is possible to further improve the image density on plain paper, storage stability, and ejection stability.

Alkali metal salt groups and/or organic amine salt groups can be used with or without dilution of an organic solvent or water.

The copolymer can be isolated by a known method such as reprecipitation or solvent distillation. In addition, the copolymer can be refined by repeating reprecipitation, membrane separation, chromatograph method, extraction method, etc. to remove unreacted monomers or low molecular weight components.

There is no specific limit to the selection of the compound represented by the chemical formula 5. Specific examples thereof include, but are not limited to, the compound represented by the chemical formula 5-1 and the compound represented by the chemical formula 5-2.

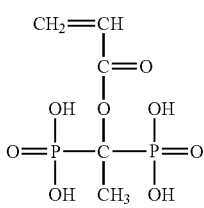

Chemical formula 5-1

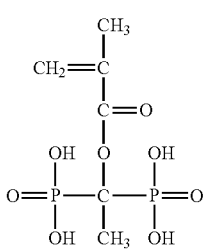

Chemical formula 5-2

There is no specific limit to the selection of the compound represented by the chemical formula 6. Specific examples thereof include, but are not limited to, the compound represented by the chemical formula 6-1 and the compound represented by the chemical formula 6-2.

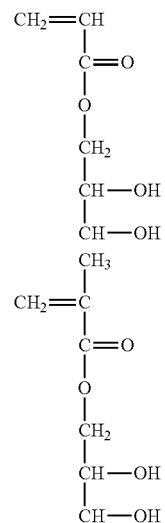

Chemical formula 6-1

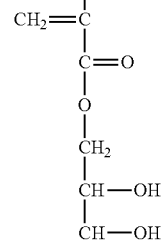

Chemical formula 6-2

There is no specific limit to the selection of the compound represented by the chemical formula 7. Specific examples thereof include, but are not limited to, the compound represented by the chemical formula 7-1 and the compound represented by the chemical formula 7-2.

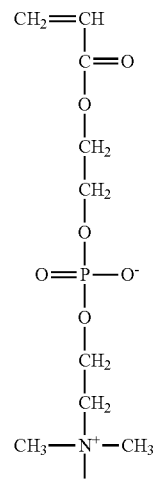

Chemical formula 7-1

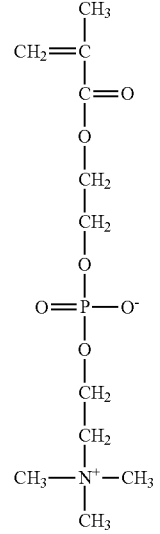

Chemical formula 7-2

There is no specific limit to the selection of the compound represented by the chemical structure 8. Specific examples thereof include, but are not limited to, the compound represented by the chemical structure 8-1 and the compound represented by the chemical structure 8-2.

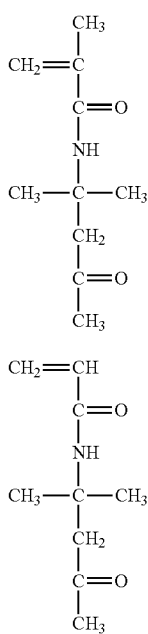

Chemical formula 8-1

Chemical formula 8-2

Of these, the compound represented by the Chemical Structure 8-2 is preferable in terms of storage stability.

The content of the structure unit represented by Chemical formula 1 in the copolymer ranges from 10% by weight to 60% by weight and preferably from 15% by weight to 50% by weight. If the content of the structure unit represented by Chemical formula 1 in the copolymer is 10% by weight or more, reactivity with calcium ions eluted from plain paper is improved, thereby ameliorating the image density. On the other hand, when the content of the structure unit represented by Chemical formula 1 in the copolymer is 60% by weight or less, the dispersion stability of a pigment is improved, so that the viscosity of an inkjet ink is stabilized, thereby improving the storage stability and ejection stability thereof.

The content of the structure unit represented by Chemical formula 1 can be obtained by measuring the acid value of the copolymer.

First, the copolymer is dissolved in a predetermined amount of water, 0.1 N potassium hydroxide methanol solution serving as neutralization reagent is dripped. The acid value is calculated by titration amount when the color of an indicator changes. The indicator is thymolphtalein solution.

The acid value of a copolymer is calculated by the following relation: $B \times 5.611 \times f/A$. In the relation, A (g) represents the mass of the copolymer, B (mL) represents the titration amount of 0.1 N potassium hydroxide methanol solution, and f represents a factor of 0.1 N potassium hydroxide methanol solution.

Next, the content (% by weight) of the structure unit represented by Chemical formula 1 in the copolymer is obtained by the following relation: $X=D/C \times 100$. In the relation, C represents the acid value of the monomer represented by Chemical formula 3 and D represents the acid value of the copolymer.

The viscosity of the 10% by weight aqueous solution of the copolymer ranges from 1.5 mPa·s to 30.0 mPa·s and preferably from 1.7 mPa·s to 18.0 mPa·s at 25° C. When the viscosity of the 10% by weight aqueous solution of a copolymer is 1.5 mPa·s or higher at 25° C., the image density on plain paper can be improved. This mechanism is inferred that the agglomeration power of a pigment is increased when reacting with a multivalent metal ion eluted from plain paper. On the other hand, when the viscosity of the 10% by weight aqueous solution of a copolymer is 30.0 mPa·s or less at 25° C., the dispersion stability of a pigment is improved, so that the viscosity of an inkjet ink is stabilized, thereby improving the storage stability and ejection stability thereof.

The mass ratio of the copolymer to the pigment when the copolymer is used as a pigment dispersant is from 0.005 to 5, preferably from 0.01 to 2, and more preferably from 0.02 to 0.5. As a result, the dispersion stability of the pigment is improved, so that the viscosity of an inkjet ink is stabilized, thereby improving the storage stability and ejection stability thereof The monomers optionally contains monomers other than the compounds represented by Chemical formulae 5 to 8.

As the monomers other than Chemical formulae 5 to 8, hydrophilic monomers and hydrophobic monomers can be used.

There is no particular limit to the selection of the hydrophobic monomers. Specific examples thereof include, but are not limited to, unsaturated ethylene monomers having aromatic ring such as styrene, α-methyl styrene, 4-t-butyl styrene, and 4-chloromethyl styrene; (meth)acrlic acid alkyl such as methyl(meth)acrylate, ethyl(meth)acrylate, n-butyl (meth)acrylate, dimethyl maleate, dimethyl itaconate, dimethyl fumarate, lauryl(meth)acrylate, tridecyl(meth)acrylate, tetradecyl(meth)acrylate, pentadecyl(meth)acrylate, hexadecyl(meth)acrylate, heptadecyl(meth)acrylate, nonadecyl (meth)acrylate, eicosyl(meth)acrylate, heneicosyl(meth) acrylate, and docosyl(meth)acrylate; and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These can be used alone or in combination.

There is no specific limit to the hydrophilic monomers. Specific examples thereof include, but are not limited to, anionic unsaturated ethylene monomers such as (meth) acrylic acid or salts thereof, maleic acid and salts thereof, monomethyl maleate, itaconic acid, monomethyl itaconate, fumaric acid, 4-styrene sulfonic acid, and 2-acrylic amide-2-methyl propane sulfonic acid; and nonionic unsaturated ethylene monomers such as 2-hydroxyethyl(meth)acrylic acid, diethylene glycol mono(meth)acrylate, triethylene glycol(meth)acrylate, tetraethylene glycol(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide. These can be used alone or in combination.

The viscosity of the 10% by weight aqueous solution of the copolymer at 25° C. can be controlled by changing the concentration of monomers on polymerization, addition amount of polymerization initiators, polymerization temperature, polymerization time, etc.

There is no specific limit to the polymerization method of monomers. Specific examples thereof include, but are not limited to, a solution polymerization method, a suspension polymerization method, a bulk polymerization method, and an emulsion polymerization method. Of these, in terms of ease of polymerization operation and molecular weight control, methods using radical polymerization initiators are preferable.

There is no specific limit to the selection of the radical initiators. Specific examples thereof include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrike), azobis(2,2'-isovaleronitrile), and non-cyano-based dimethyl-2,2'azobis isobutylate. Of these, organic peroxides and azo-based compounds are preferable and azo compounds are more preferable in terms of ease of molecular weight control and low resolution temperature.

The mass ratio of the polymerization initiator to the total amount of the monomers is from 0.01 to 0.1.

To control the molecular weight of a copolymer, a chain transfer agent is optionally added.

There is no specific limit to the chain transfer agent. Specific examples thereof include, but are not limited to, mercapto acetate, mercapto propionate, 2-propane thiol, 2-meracapto ethanol, thiophenol, dodecyl mercaptane, 1-dodecane thiol, and thioglycerol.

The polymerization temperature is from 50° C. to 150° C.

The polymerization time is from 3 hours to 48 hours.

It is preferable to use polyvinyl pyrolidone as a pigment dispersant together with the copolymer. It also can be used as an additive.

The K value of polyvinyl pyrolidone is from 10 to 65 and preferably from 10 to 33. By adding polyvinyl pyrolidone, the dispersion stability of the pigment is improved, so that the viscosity of an inkjet ink is stabilized, thereby improving the storage stability and ejection stability thereof. This is thought to be because it is easily attached to the surface of a pigment.

The k value is a viscosity characteristic value relating to molecular weight and can be calculated by applying the relative viscosity at 25° C. measured by a capillary viscometer to Fikentscher formula.

$$K=(1.5 \log \eta_{rel}-1)/(0.15+0.003C)+(300c \log \eta_{rel}+(c+1.5c \log \eta_{rel})^2)^{1/2}/(0.15c+0.003c^2)$$

In this formula, $\eta_{rel}$ represents relative viscosity to water of polyvinyl pyrolidone aqueous solution and c represents concentration (% by weight) of polyvinyl pyrolidone in polyvinylpyrolidone aqueous solution.

The mass ratio of polyvinylpyrolidone to a pigment when polyvinylpyrolidone is used as a pigment dispersant together with the copolymer is from 0.005 to 5, preferably from 0.01 to 3, and more preferably from 0.05 to 1. As a result, the dispersion property of the pigment is improved, so that the viscosity of an inkjet ink is stabilized, thereby improving the storage stability and ejection stability thereof As water, deionized water, ultrafiltered water, reverse osmosis water, distilled water, pure water, and ultra pure water can be used.

The content of water in an inkjet ink is from 20% by weight to 60% by weight.

The hydrosoluble organic solvent is added to impart moisture to improve the ejection stability of an inkjet ink.

The content of the hydrosoluble organic solvent in the inkjet ink is from 10% by weight to 50% by weight.

There is no specific limit to the selection of hydrosoluble organic solvents.

Specific examples thereof include, but are not limited to, polyols such as ethylene glycol, diethylene glycol, 1,3-butane diol, 3-methyl-1,3-butyl glycol, triethylene glycol, polyethylene glycol, polypropylene glycol, dipropylene glycol, tripropylene glycol, polypropylene glycol, 1,5-pentane diol, 1,6-hexane diol, glycerin, 1,2,6-hexane triol, 2-ethyl-1,3-hexane diol, 2,2,4-trimethyl-1,3-pentan diol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate. These can be used alone or in combination. Of these, 1,3-butane diol, diethylene glycol, 2,2,4-trimethyl-1,3-pentane diol, triethylene glycol, and glycerin are preferable. Glycerin is more preferable.

There is no specific limit to the selection of the pigment. Inorganic pigments and organic pigments are suitable. These can be used alone or in combination.

Specific examples of the inorganic pigments include, but are not limited to, titanium oxide, iron oxide, calcium oxide, barium sulfate, aluminum hydroxide, barium yellow, ferric hexacyanoferrate, cadmium red, chrome yellow, metal powder, and carbon black. Of these, carbon black is preferable.

There is no specific limit to the method of manufacturing carbon black. Specific examples thereof include, but are not limited to, a contact method, a furnace method, and a thermal method. Of these, the furnace method and a channel method are preferable.

Specific examples of the organic pigments include, but are not limited to, azo pigments, azomethine pigments, polycyclic pigments, dye chleates, nitoro pigments, nitroso pigments, and aniline black. Of these, azo pigments and polycyclic pigments are preferable.

Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

Specific examples of the dye chelates include, but are not limited to, base dye type chelates and acid dye type chelates.

Specific examples of the pigments for black color include, but are not limited to, carbon black (C.I. Pigment Black 7) such as furnace black, lamp black, acetylene black, and channel black, inorganic pigments such as copper, iron (C.I. Pigment Black 11), and titanium oxides, and organic pigments such as aniline black (C.I. Pigment Black 1).

The primary average particle diameter of carbon black is from 15 nm to 40 nm.

In addition, the specific surface area of carbon black as measured by the BET method is from 50 m$^2$/g to 300 m$^2$/g.

The DBP oil absorption amount of carbon black is from 40 ml/100 g to 150 ml/100 g.

The volatile content of carbon black is from 0.5% by weight to 10% by weight.

The pH of carbon black is from 2 to 9.

Specific examples of carbon black available on market include, but are not limited to, No. 2300, No. 900, MCF-88, No. 33, No. 40, No. 45, No. 52, MA7, MA8, MA100, No. 2200B (all manufactured by Mitsubishi Chemical Corporation); Raven 700, Raven 5750, Raven 5250, Raven 5000, Raven 3500, and Raven 1255 (all manufactured by Colombia Co., Ltd.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Corporation); and Color Black FW1, Color Black FW2, Color Black FW2V, Color Black FW18, Color Black 200, Color Black S150, Color Black 5160, Color Black S170, Printex 35, Printex U, Printex V, Printex 140U, Printex 140V, and Special Black 6, Special Black 5, Special Black 4A, and Special Black 4 (all manufactured by Degussa AG).

Specific examples of pigments for yellow include, but are not limited to, C.I.Pigment Yellow 1, C.I.Pigment Yellow 2, C.I.Pigment Yellow 3, C.I.Pigment Yellow 12, C.I.Pigment Yellow 13, C.I.Pigment Yellow 14, C.I.Pigment Yellow 16, C.I.Pigment Yellow 17, C.I.Pigment Yellow 73, C.I.Pigment Yellow 74, C.I.Pigment Yellow 75, C.I.Pigment Yellow 83, C.I.Pigment Yellow 93, C.I.Pigment Yellow 95, C.I.Pigment Yellow 97, C.I.Pigment Yellow 98, C.I.Pigment Yellow 114, C.I.Pigment Yellow 120, C.I.Pigment Yellow 128, C.I.Pigment Yellow 129, C.I.Pigment Yellow 138, C.I.Pigment Yellow 150, C.I.Pigment Yellow 151, C.I.Pigment Yellow 154, C.I.Pigment Yellow 155, C.I.Pigment Yellow 174, C.I.Pigment Yellow, and C.I.Pigment Yellow 180.

Specific examples of pigments for magenta include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

Specific examples of pigments for cyan include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pigment Pat Blue 4, and C.I.Pigment Pat Blue 60.

By using Pigment Yellow 74 as yellow pigment, Pigment Red 122 and Pigment Violet 19 as magenta pigment, and Pigment Blue 15:3 as cyan pigment, an obtained inkjet has excellent color tone and lightfastness.

The volume median diameter D50 of the pigment is 150 nm or less.

The volume median diameter (D50) is measured by MicroTrack UPA (manufactured by Nikkiso Co., Ltd.) at 23° C. and 55% RH according to dynamic light scattering method.

The content of the pigment in the inkjet ink is from 0.1% by weight to 20% by weight.

The pigment can be dispersed by a pigment dispersant other than the copolymer and polyvinyl pyrolidone and subject to graft treatment or encapsulation treatment by coating with a resin.

It is preferable that the inkjet ink further contains resin particles having a volume median diameter D50 of from 70 nm to 250 nm. As a result, image uniformity on coated paper for printing can be improved. This mechanism is inferred that uneven agglomeration of the pigment is prevented in the process of inkjet ink being dried on coated paper for printing.

The resin particle preferably has a volume median diameter D50 of from 100 nm to 220 nm.

The volume median diameter D50 of the resin particle is measured by MicroTrack UPA (manufactured by Nikkiso Co., Ltd.) at 23° C. and 55% RH according to dynamic light scattering method.

There is no specific limit to the selection of resins forming the resin particle. Condensation-based synthetic resins, addition-based synthetic resins, and natural polymers are suitable. These can be used alone or in combination.

Specific examples of the condensation-based synthetic resins include, but are not limited to, polyester resins, polyurethane resins, epoxy resins, polyamide resins, polyether resins, (meth)acrylic resins, acrylic-silicone-based resins, and fluorine-containing resins.

Specific examples of the addition-based synthetic resins include, but are not limited to, polyolefin resins, styrene-based resins, vinyl alcohol-based resins, vinyl ester-based resins, acrylic acid-based resins, and unsaturated carboxylic acid-based resins.

Specific examples of the natural polymers include, but are not limited to, celluloses, rosins, and natural rubber.

Of these, polyurethane, acrylic-silicone-based resins, and acrylic-styrene-based resins are preferable.

The content of the resin particle in the inkjet ink is from 0.5% by weight to 15% by weight and preferably from 1% by weight to 8% by weight.

The minimum film-forming temperature (MFT) of the resin particle is 30° C. or lower. As a result, the fixability of a pigment can be improved by coating at room temperature.

The glass transition temperature of the resin particle is −30° C. or higher.

Accordingly, the viscosity of resin film is increased, thereby preventing occurrence of tackiness on recorded matter.

The inkjet ink optionally contains a pigment dispersant other than the copolymer and polyvinyl pyrolidone, a pH regulator, a preservatives and fungicides, a chelate reagent, a corrosion inhibitor, an antioxidant, ultraviolet absorbent, an oxygen absorbent, and a light stabilizer.

There is no particular limit to the pigment dispersant other than the copolymer and polyvinyl pyrolidone. Specific examples thereof include, but are not limited to, anionic surfactants, nonionic surfactants, amphoteric surfactants, and nonionic surfactants. These can be used alone or in combination.

Specific examples of the anion surfactants include, but are not limited to, alkyl sulfocarboxylix acid salts, α-olefin sulfonic acid salts, polyoxyethylene alkyl ether acetic acid salts, N-acyl amino acid and salts thereof, N-acyl methyl taurine salts, polyoxyalkylether sulfuric acid salts, polyoxyethylene alkyl ether phosphoric acid salts, rosin acid soap, castor oil sulfuric acid ester salts, lauryl alcohol sulfuric acid ester salts, alkyl phenol type phosphotic acid esters, formalin condensation products of naphthalene sulfonic acid salts, alkyl type phosphoric acid esters, alkyl aryl sulfonic acid salts, diethyl sulfosuccinic acid salts, diethyl hexyl sulfosuccinic acid salt, and dioctyl sulfosuccinic acid salts.

Specific examples of the cation surfactants include, but are not limited to, 2-vinylpyridine derivatives and poly-4-vinylpyridine derivatives.

Specific examples of the amphoteric surfactants include, but are not limited to, lauryl dimethylamino acetic acid betaine, 2-alkyl-N-carboxymethyl-N-hydroxyethyl imidazolinium betaine, coconut oil fatty acid amidepropyl dimethyl amino acetic acid betaine, polyoctyl polyaminoethyl glycine, and imidazoline derivatives.

Specific examples of the nonionic surfactant include, but are not limited to, ether-based surfactants such as polyoxyethylene nonylphenyl ether, polyoxyethylene octyl phenyl ether, polyoxyethylene dodecyl phenyl ether, polyoxyethylene lauryl ether, polyoxyethylene oleyl ether, polyoxyethylene alkyl ether, and polyoxyallylkyl alkylether; ester-based surfactants such as polyoxyethylene oleic acid, polyoxyethylene oleic acid ester, polyoxyethylene distearyl acid ester, sorbitan laurate, sorbitan monostearate, sorbitan monooleate, sorbitan sesquioleate, polyoxyethylene monooleate, and polyoxyethylene sterate; and acetylene glycol-based surfactants such as 2,4,7,9-tetramethyl-5-desine-4,7-diol, 3,6-dimethyl-4-octine-3,6-diol, and 3,5-dimethyl-1-hexine-3-ol.

There is no specific limit to the selection of the pH regulator. Specific examples thereof include, but are not limited to, alcohol amines, hydroxides of alkali metal, ammonium hydroxides, phosphonium hydroxides, and alkali metal carbonates.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

The pH of the inkjet ink is from 8.5 to 11 and preferably from 9 to 11.

pH of the inkjet ink can be measured by, for example, a pH meter (HM-30R, manufactured by DKK-TOA CORPORATION).

Specific examples of the preservatives and fungicides include, but are not limited, dehydrosodium acetate, sodium sorbinate, 2-pyridine thiol-1-oxide sodium, sodium benzoate, and pentachlorophenol sodium.

There is no specific limit to the selection of the chelate reagents. Specific examples thereof include, but are not limited to, ethylene diamine sodium tetraacetate, nitrilo sodium triacetate, hydroxyethyl ethylene diamine sodium tri-acetate, diethylene triamine sodium quinternary acetate, and uramil sodium diacetate.

There is no specific limit to the selection of the corrosion inhibitors. Specific examples thereof include, but are not limited to, acid sulfite, thiosodium sulfate, ammonium thiodiglycolate, diisopropyl ammonium nitrite, pentaerythritol tetranitrate, and dicyclohexyl ammonium nitrite.

There is no specific limit to the selection of the anti-oxidants. Specific examples thereof include, but are not limited to, phenol-based anti-oxidants (including hindered phenol-based anti-oxidants), amine-based anti-oxidants, sulfur-based anti-oxidants, and phosphorous-based anti-oxidants.

There is no specific limit to the selection of the ultraviolet absorbers. Specific examples thereof include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

The inkjet ink can be manufactured by dissolving or dispersing a composition containing a hydrosoluble organic solvent, a pigment, and a copolymer in water followed by optional stirring and mixing.

There is no specific limit to the disperser used to dissolve or disperse the composition in water. Specific examples thereof include, but are not limited to, a sand mill, a homogenizer, a ball mill, a paint shaker, and an ultrasonic dispersion device.

There is no specific limit to the stirrer for use in stirring water in which the composition is dissolved or dispersed. For example, a stirrer having a stirring blade, a magnetic stirrer, and a high speed dispersion device are suitably used.

The viscosity of the inkjet ink at 25° C. is 3 mPa·s to 20 mPa·s. When the ink viscosity of the inkjet ink at 25° C. is 3 mPa·S or greater, the image density and text quality are improved. When the ink viscosity of the inkjet ink at 25° C. is 20 mPa·S or less, the ejection stability of the inkjet ink is improved.

The viscosity of the inkjet ink at 25° C. can be measured by, for example, a viscometer (RE-550L, manufactured by TOKI SANGYO CO., LTD.).

The surface tension of the inkjet ink at 25° C. is 40 mN/m or less. When the surface tension of the inkjet ink at 25° C. is greater than 40 mN/m, leveling of the inkjet ink easily occurs, so that it takes a long time to dry the ink.

There is no specific limit to the selection of the recording medium on which an image is recorded with an inkjet ink. Specific examples thereof include, but are not limited to, plain paper, coated paper for printing, gloss paper, special paper, cloth, film, and transparent sheets. Of these, plain paper and coated paper for printing are preferable.

Plain paper is advantageous because it is inexpensive. Moreover, coated paper for printing is relatively inexpensive in comparison with gloss paper and advantageous in that smooth images with gloss are printed.

However, the image has low image density and a low level of drying property, which is not preferable for recording with inkjet ink.

It is preferable to use the inkjet ink for a recording medium having an eluting amount of calcium ion of from $1.0 \times 10^{-5}$ g/g to $5.0 \times 10^{-4}$ g/g. When a recording medium having an eluting amount of calcium ion of from $1.0 \times 10^{-5}$ g/g is used, the calcium ion agglomerates as a result of reaction with the copolymer, which increases the image density. When the eluting amount of the calcium ion is $5.0 \times 10^{-4}$ or higher, permeation of the inkjet ink to a recording medium is not inhibited, thereby improving the drying property of ink, abrasion resistance, and marker resistance.

Therefore, when the inkjet ink is used, the image density and drying property are improved on plain paper and coated paper for printing.

The inkjet recording device has an ejection device to record an image on a recording medium by ejecting an inkjet ink from the inkjet head and optional devices such as a stimulus generating device and a control device.

The ejection device applies a stimulus to an inkjet ink and ejects it to record images.

Such a stimulus can be generated by the stimulus generating device.

There is no specific limit to the selection of the stimulus. For example, heat (temperature), pressure, vibration, and light are suitable. These can be used alone or in combination. Of these, heat and pressure are preferable.

There is no specific limit to the selection of such stimulus generating device. For example, a heater, a pressurization device, a piezoelectric element, a vibrator, an ultrasonic oscillator, and light are suitable.

Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

There is no specific limit to the method of ejecting an inkjet ink. For example, inkjet inks can be ejected by a method applying heat energy to inkjet ink in an inkjet head by a thermal head in response to the recording signal to generate air bubbles and ejecting the inkjet ink from the nozzles by the pressure of the air bubbles or a method applying a voltage to a piezoelectric element attached to the pressure chamber in the ink flow path in an inkjet head to make the piezoelectric element bent so that the volume of the pressure chamber decreases, thereby ejecting the inkjet ink from the nozzle.

There is no specific limit to the controller which can control behaviors of each device. Specific example thereof include, but are not limited to, a sequencer and a computer.

FIG. 1 is a diagram illustrating an example of the ink jet recording device.

An inkjet recording device 100 has an inkjet recording unit 101 and an ink cartridge 200, which is detachably attached to the inkjet recording unit 101.

The inkjet recording unit 101 has a sheet feeder tray 102 to feed recording media, an ejection tray 103 mounted to the inkjet recording unit 101 to store the recording media on which images are recorded, and an ink cartridge insertion unit 104.

On the upper surface of the ink cartridge insertion unit 104 is arranged an operating portion 105 including operation keys, a display, etc. The ink cartridge insertion unit 104 has a front cover 115 that is openable and closable to detach and attach an ink cartridge 200.

The reference numeral 111 represents an upper cover and, 112, the front surface of the front cover.

Figure 2:
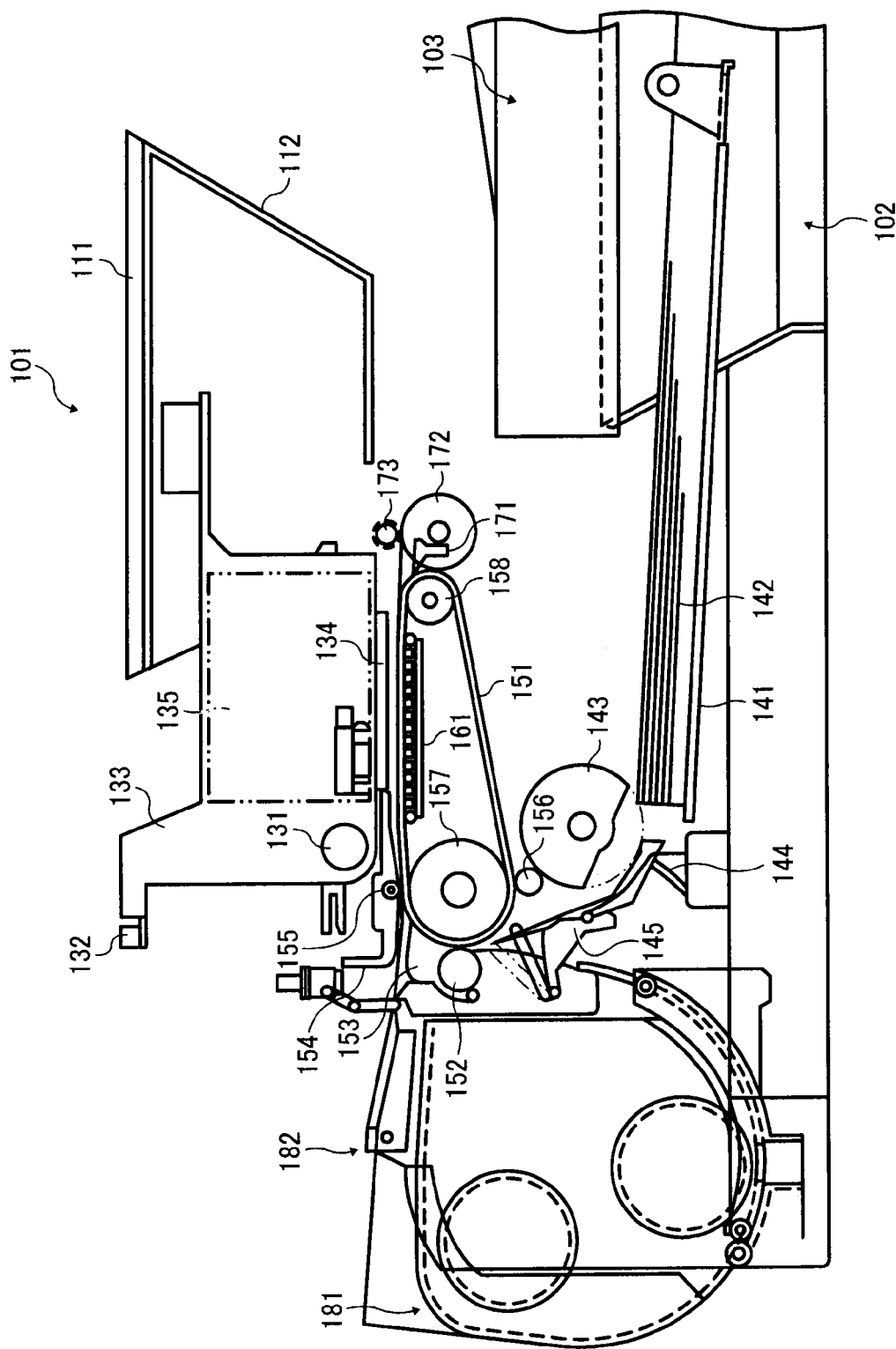
FIG. 2 is a schematic diagram illustrating the inkjet recording device illustrated in FIG. 1.
Figure 3:
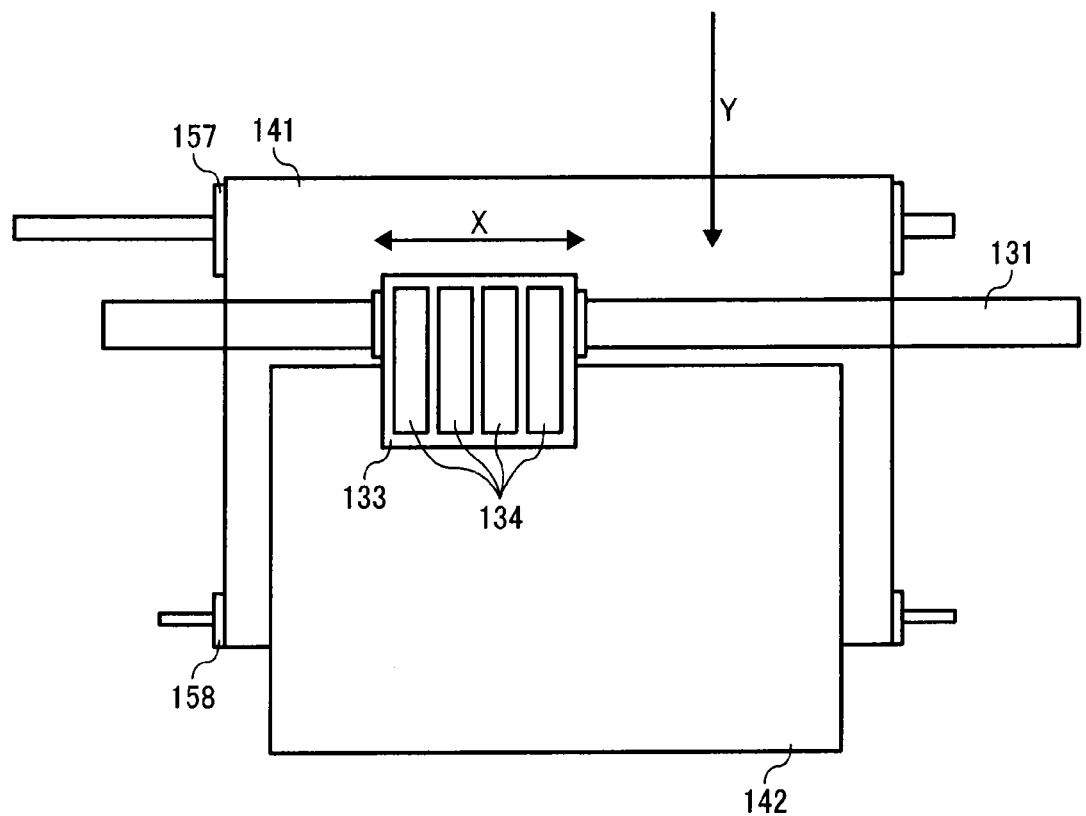
FIG. 3 is a schematic enlarged diagram illustrating the inkjet head illustrated in FIG. 1.

Inside the inkjet recording device 101, as illustrated in FIGS. 2 and 3, a guide rod 131 and a stay 132 that laterally bridge side plates provided on the right side and left side hold a carriage 133 slidably movable. A main scanning motor moves the carriage 133 for scanning in a main-scanning direction X.

The carriage 133 has four inkjet heads 134 that eject inkjet ink of each color of yellow (Y), cyan (C), magenta (M), and black (Bk) while multiple ink ejection mouths are arranged in the direction crossing the main scanning direction X with the ink ejection direction downward.

The inkjet head 134 has an energy generation device to eject the inkjet inks.

There is no specific limit to the selection of the energy generation device.

Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

The carriage 133 has sub tanks 135 for each color to supply each color ink to the inkjet head 134. The inkjet ink is supplied and replenished to the sub tank 135 from the ink cartridge 200 mounted onto the ink cartridge insertion unit 104 via a tube for ink supply.

As a sheet feeding unit to feed a recording medium (typically sheet) 142 loaded on a sheet loader 141 of the sheet feeder tray 102, the inkjet recording unit 101 has a half-moon shape roller (sheet feeding roller 143) to separate and feed the sheet 142 one by one from a sheet loader (pressure plate) 141 and a separation pad 144 that is made of a material having a large friction index and arranged facing the sheet feeding roller 143 while biased towards the sheet feeding roller 143.

Moreover, as a transfer unit to transfer the sheet 142 fed from the sheet feeding unit below the inkjet head 134, the inkjet recording device 101 includes a transfer belt 151 to transfer the sheet 142 by electrostatic adsorption, a counter roller 152 to transfer the sheet 142 fed from the sheet feeding unit via a guide 145 by pinching the sheet 142 with a transfer belt 151, a transfer guide 153 to make the sheet 142 trace the transfer belt 151 by changing the transfer direction of the sheet 142 being sent substantially vertically upward substantially 90°, and a front end pressure roller 155 biased to the transfer belt 151 by a pressing member 154.

In addition, the inkjet recording unit 101 includes a charging roller 156 to charge the surface of the transfer belt 151.

The transfer belt 151 is an endless form belt, supported by a transfer roller 157 and a tension roller 158 and rotatable in a belt transfer direction Y.

The transfer belt 151 has, for example, a top surface layer formed of a resin (for example, polymer (ETFE) of tetrafluoroethylene and ethylene) having a thickness of about 40 μm to which the sheet 142 is adsorbed and a back layer (moderate resistance layer, earth layer) formed of the same material as the top surface layer except that the resistance is controlled by carbon.

On the rear side of the transfer belt 151, a guiding member 161 is arranged corresponding to the image recording area by the inkjet head 134.

Moreover, the inkjet recording unit 101 has a separation claw 171 to separate the sheet 142 from the transfer belt 151, an ejection roller 172, and an ejection roller 173 as an ejection unit to eject (discharge) the sheet 142 on which images are recorded by the inkjet head 134. A paper ejection tray 103 is arranged below the ejection roller 173.

A duplex printing sheet feeding unit 181 is mounted in a detachable and attachable manner to the rear side of the inkjet recording unit 101.

The duplex printing sheet feeding unit 181 takes in and reverses the sheet 142 that is returned by the reverse rotation of the transfer belt 151 and feeds it again between the counter roller 152 and the transfer belt 151.

A bypass sheet feeding unit 182 is provided on the upper surface of the duplex printing sheet feeding unit 181

In this inkjet recording device 100, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction substantially 90°.

Since the transfer belt 151 is charged by the charging roller 156 at this point in time, the sheet 142 is electrostatically adsorbed to the transfer belt 151 and transferred. By driving the inkjet head 134 in response to the image signal while moving the carriage 133, the inkjet ink is ejected to the sheet 142 not in motion to record an image in an amount of one line.

Thereafter the sheet 142 is transferred in a predetermined amount to be ready for recording the next line. On receiving a signal indicating that the recording has completed or the rear end of the sheet 142 has reached the image recording area, the recording operation stops and the sheet 142 is ejected to the paper ejection tray 103.

When the remaining amount of the inkjet ink in the sub-tanks 135 is detected that it is close to empty, a predetermined amount of the inkjet ink is replenished to the sub tank 135 from the ink cartridge 200.

Figure 4:
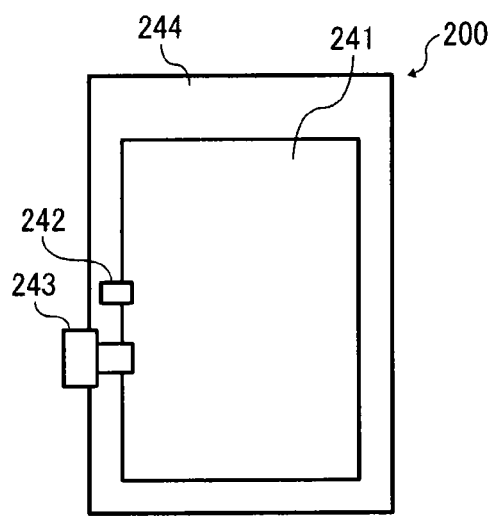
FIG. 4 is a schematic diagram illustrating an example of the ink cartridge illustrated in FIG. 1.

FIG. 4 illustrates the ink cartridge 200.

The ink cartridge 200 has an ink bag 241. The ink bag 241 is filled with the inkjet ink through an ink inlet 242 followed by air exhaustion. Thereafter, the ink inlet 242 is closed by fusion. When in use, the ink is supplied to the inkjet recording unit 101 by piercing an ink outlet 243 made of rubber material by the needle provided to the inkjet recording unit 101.

The ink bag 241 is formed of a packaging material such as aluminum laminate film having no air permeability. The ink bag 241 is accommodated in a plastic cartridge housing 244, which is mounted onto the inkjet recording unit 101 in a detachable and attachable manner.

In this inkjet recording device 100, it is possible to dissemble the ink cartridge housing 244 and replace only the ink bag 241 therein when the ink in the ink cartridge 200 is used up.

In addition, the ink cartridge 200 stably supplies the inkjet ink even when the ink cartridge 200 is placed upright and installed by front loading. Therefore, even when the inkjet recording unit 101 is blocked from above, for example, it is accommodated in a rack or a thing is placed on the upper surface of the inkjet recording unit 101, the ink cartridge 200 is easily exchanged.

A serial type (shuttle type) in which the carriage scans is used in this description but the inkjet ink can be applied to a line-type inkjet recording device having a line type head.

The inkjet recording device 100 can be suitably applied to an inkjet printer, facsimile machines, photocopiers, multi-functional peripherals (serving as a printer, a facsimile machine, and a photocopier), etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto. Numbers in parts or % represent by weight. The following abbreviations represent the following compounds.

AEDPA: 1-acryloxy ethane-1,1-diphosphonic acid (Chemical formula 5-1)

MAEDPA: 1-methacryloxy ethane-1,1-diphosphonic acid (Chemical formula 5-2)

GLA: Glycerin acrylate (Chemical formula 6-1)

GLM: Glycerin methacrylate (BLEMMER® GLM, manufactured by NOF CORPORATION) (Chemical formula 6-2)

APC: 2-acryloyloxy ethyl phosphoryl choline (Chemical formula 7-1).

MPC: 2-methacryloyloxy ethyl phosphoryl choline (Chemical formula 7-2).

DAMM: Diacetone methacrylamide (Chemical formula 8-1)

DAMM: Diacetone acrylamide (Chemical formula 8-2)

AIBN: Azobis isobutyl nitrile

Preparation of 10% by Weight Aqueous Solution of Copolymer 1-1

9.0 g of MAEDPA, 21.0 g of GLM, and 170.0 g of ethanol were charged in a flask followed by stirring to obtain a uniform solution. Next, after blowing nitrogen thereinto for 30 minutes, the system was heated to 65° C. and 2.0 g of AIBN was added thereto to conduct polymerization reaction for five hours. Moreover, subsequent to solvent removal by using an evaporator, the concentration of the resultant was adjusted to about 10% by dilution with water followed by neutralization by sodium hydroxide in such a manner that the neutralization rate was 100%. Next, the resultant was refined by dialysis membrane for three days, the concentration thereof was adjusted to 10% to obtain 10% aqueous solution of Copolymer 1-1.

10% aqueous solution of Copolymer 1-1 had a viscosity of 10.7 mPa·s.

Preparation of 10% by Weight Aqueous Solution of Copolymer 1-2

10% aqueous solution of Copolymer 1-2 was obtained in the same manner as in 10% aqueous solution of Copolymer 1-1 except that the neutralization rate was 50%.

10% aqueous solution of Copolymer 1-2 had a viscosity of 5.1 mPa·s.

Preparation of 10% by Weight Aqueous Solution of Copolymer 1-3

10% aqueous solution of Copolymer 1-3 was obtained in the same manner as in 10% aqueous solution of Copolymer 1-1 except that GLA was used instead of GLM.

10% aqueous solution of Copolymer 1-3 had a viscosity of 11.3 mPa·s.

Preparation of 10% by Weight Aqueous Solution of Copolymer 1-4

10% aqueous solution of Copolymer 1-4 was obtained in the same manner as in 10% aqueous solution of Copolymer 1-1 except that potassium hydroxide was used instead of sodium hydroxide.

10% aqueous solution of Copolymer 1-4 had a viscosity of 10.8 mPa·s.

Preparation of 10% by Weight Aqueous Solution of Copolymer 1-5

10% aqueous solution of Copolymer 1-5 was obtained in the same manner as in 10% aqueous solution of Copolymer 1-1 except that lithium hydroxide was used instead of sodium hydroxide.

10% aqueous solution of Copolymer 1-5 had a viscosity of 10.9 mPa·s.

Preparation of 10% by Weight Aqueous Solution of Copolymer 1-6

10% aqueous solution of Copolymer 1-6 was obtained in the same manner as in 10% aqueous solution of Copolymer 1-1 except that monoethanol amine (EA) was used instead of sodium hydroxide.

10% aqueous solution of Copolymer 1-6 had a viscosity of 10.3 mPa·s.

Preparation of 10% by Weight Aqueous Solution of Copolymer 1-7

10% aqueous solution of Copolymer 1-7 was obtained in the same manner as in 10% aqueous solution of Copolymer 1-1 except that dimethyl ethanolamine (DMEA) was used instead of sodium hydroxide.

10% aqueous solution of Copolymer 1-7 had a viscosity of 10.6 mPa·s.

Preparation of 10% by Weight Aqueous Solution of Copolymer 1-8

10% aqueous solution of Copolymer 1-8 was obtained in the same manner as in 10% aqueous solution of Copolymer 1-1 except that AEDPA was used instead of MAEDPA.

10% aqueous solution of Copolymer 1-8 had a viscosity of 9.6 mPa·s.

Preparation of 10% by Weight Aqueous Solution of Copolymer 1-9

10% aqueous solution of Copolymer 1-9 was obtained in the same manner as in 10% aqueous solution of Copolymer 1-1 except that the neutralization rate was 40%.

10% aqueous solution of Copolymer 1-9 had a viscosity of 2.4 mPa·s.

Preparation of 10% by Weight Aqueous Solution of Copolymer 1-10

10% aqueous solution of Copolymer 1-10 was obtained in the same manner as in 10% aqueous solution of Copolymer 1-1 except that the addition amounts of MAEDPA, GLM, ethanol, and AIBN were changed to 4.0 g, 16.0 g, 380.0 g, and 4.0 g, respectively.

10% aqueous solution of Copolymer 1-10 had a viscosity of 1.5 mPa·s.

Preparation of 10% by Weight Aqueous Solution of Copolymer 1-11

10% aqueous solution of Copolymer 1-11 was obtained in the same manner as in 10% aqueous solution of Copolymer 1-1 except that the addition amounts of MAEDPA, GLM, and ethanol were changed to 4.6 g, 41.4 g, and 154.0 g, respectively.

10% aqueous solution of Copolymer 1-11 had a viscosity of 30.0 mPa·s.

Preparation of 10% by Weight Aqueous Solution of Copolymer 1-12

10% aqueous solution of Copolymer 1-12 was obtained in the same manner as in 10% aqueous solution of Copolymer 1-1 except that the addition amounts of MAEDPA, GLM, ethanol, and AIBN were changed to 9.0 g, 6.0 g, 285.0 g, and 3.0 g, respectively.

10% aqueous solution of Copolymer 1-12 had a viscosity of 1.5 mPa·s.

Preparation of 10% by Weight Aqueous Solution of Copolymer 1-13

10% aqueous solution of Copolymer 1-13 was obtained in the same manner as in 10% aqueous solution of Copolymer 1-1 except that the addition amounts of MAEDPA, GLM, and ethanol were changed to 27.6 g, 18.4 g, and 154.0 g, respectively.

10% aqueous solution of Copolymer 1-13 had a viscosity of 30.0 mPa·s.

Preparation of 10% by Weight Aqueous Solution of Copolymer 1-14

10% aqueous solution of Copolymer 1-14 was obtained in the same manner as in 10% aqueous solution of Copolymer 1-1 except that the addition amounts of MAEDPA, GLM, ethanol, and AIBN were changed to 6.4 g, 25.6 g, 768.0 g, and 8.0 g, respectively.

10% aqueous solution of Copolymer 1-14 had a viscosity of 1.3 mPa·s.

Preparation of 10% by Weight Aqueous Solution of Copolymer 1-15

10% aqueous solution of Copolymer 1-15 was obtained in the same manner as in 10% aqueous solution of Copolymer 1-1 except that the addition amounts of MAEDPA, GLM, and ethanol were changed to 5.0 g, 45.0 g, and 150.0 g, respectively.

10% aqueous solution of Copolymer 1-15 had a viscosity of 30.8 mPa·s.

Preparation of 10% by Weight Aqueous Solution of Copolymer 1-16

10% aqueous solution of Copolymer 1-16 was obtained in the same manner as in 10% aqueous solution of Copolymer 1-1 except that the addition amounts of MAEDPA, GLM, ethanol, and AIBN were changed to 7.2 g, 4.8 g, 288.0 g, and 3.0 g, respectively.

10% aqueous solution of Copolymer 1-16 had a viscosity of 1.4 mPa·s.

Preparation of 10% by Weight Aqueous Solution of Copolymer 1-17

10% aqueous solution of Copolymer 1-17 was obtained in the same manner as in 10% aqueous solution of Copolymer 1-1 except that the addition amounts of MAEDPA, GLM, and ethanol were changed to 30.0 g, 20.0 g, and 150.0 g, respectively.

10% aqueous solution of Copolymer 1-17 had a viscosity of 33.9 mPa·s.

Preparation of 10% by Weight Aqueous Solution of Copolymer 1-18

10% aqueous solution of Copolymer 1-18 was obtained in the same manner as in 10% aqueous solution of Copolymer 1-1 except that the addition amounts of MAEDPA, GLM, ethanol, and AIBN were changed to 1.6 g, 30.4 g, 768.0 g, and 8.0 g, respectively.

10% aqueous solution of Copolymer 1-18 had a viscosity of 1.3 mPa·s.

Preparation of 10% by Weight Aqueous Solution of Copolymer 1-19

10% aqueous solution of Copolymer 1-19 was obtained in the same manner as in 10% aqueous solution of Copolymer 1-1 except that the addition amounts of MAEDPA, GLM, and ethanol were changed to 2.5 g, 47.5 g, and 150.0 g, respectively.

10% aqueous solution of Copolymer 1-19 had a viscosity of 33.6 mPa·s.

Preparation of 10% by Weight Aqueous Solution of Copolymer 1-20

10% aqueous solution of Copolymer 1-20 was obtained in the same manner as in 10% aqueous solution of Copolymer 1-1 except that the addition amounts of MAEDPA, GLM, ethanol, and AIBN were changed to 9.6 g, 2.4 g, 288.0 g, and 3.0 g, respectively.

10% aqueous solution of Copolymer 1-20 had a viscosity of 1.2 mPa·s.

Preparation of 10% by Weight Aqueous Solution of Copolymer 1-21

10% aqueous solution of Copolymer 1-21 was obtained in the same manner as in 10% aqueous solution of Copolymer 1-1 except that the addition amounts of MAEDPA, GLM, and ethanol were changed to 40.0 g, 10.0 g, and 150.0 g, respectively.

10% aqueous solution of Copolymer 1-21 had a viscosity of 34.8 mPa·s.

Viscosity

The viscosity of 10% by weight aqueous solution of the copolymers was measured at 25° C. by using a rotation viscometer (RE500L, Cone plate type, manufactured by TOKI SANGYO CO., LTD.). To be specific, 1.1 mL of 10% by weight aqueous solution of the copolymer was taken and charged into a sample cup of the viscometer. Next, after the sample cup was mounted onto the viscometer and left still for one minute, the rotor of the viscometer was rotated adjusting the rotation number according to the viscosity of the 10% by weight aqueous solution of the copolymer to read the viscosity one minute after.

In Table 1, the characteristics of Copolymers 1-1 to 1-21 are shown.

TABLE 1

| Copolymer | Monomer | | | | Nuetral- izing agent | Neutral- ization rate | Viscosity (mPa · s) |
| --- | --- | --- | --- | --- | --- | --- | --- |
| | Kind | Content (% by weight) | Kind | Content (% by weight) | | | |
| 1-1  | MAEDPA | 30 | GLM | 70 | NaOH | 100 | 10.7 |
| 1-2  | MAEDPA | 30 | GLM | 70 | NaOH | 50  | 5.1 |
| 1-3  | MAEDPA | 30 | GLA | 70 | NaOH | 100 | 11.3 |
| 1-4  | MAEDPA | 30 | GLM | 70 | KOH  | 100 | 10.8 |
| 1-5  | MAEDPA | 30 | GLM | 70 | LiOH | 100 | 10.9 |
| 1-6  | MAEDPA | 30 | GLM | 70 | EA   | 100 | 10.3 |
| 1-7  | MAEDPA | 30 | GLM | 70 | DMEA | 100 | 10.6 |
| 1-8  | AEDPA  | 30 | GLM | 70 | NaOH | 100 | 9.6 |
| 1-9  | MAEDPA | 30 | GLM | 70 | NaOH | 40  | 2.4 |
| 1-10 | MAEDPA | 20 | GLM | 80 | NaOH | 100 | 1.5 |
| 1-11 | MAEDPA | 10 | GLM | 90 | NaOH | 100 | 30.0 |
| 1-12 | MAEDPA | 60 | GLM | 40 | NaOH | 100 | 1.5 |
| 1-13 | MAEDPA | 60 | GLM | 40 | NaOH | 100 | 30.0 |
| 1-14 | MAEDPA | 20 | GLM | 80 | NaOH | 100 | 1.3 |
| 1-15 | MAEDPA | 10 | GLM | 90 | NaOH | 100 | 30.8 |
| 1-16 | MAEDPA | 60 | GLM | 40 | NaOH | 100 | 1.4 |
| 1-17 | MAEDPA | 60 | GLM | 40 | NaOH | 100 | 33.9 |
| 1-18 | MAEDPA | 5  | GLM | 95 | NaOH | 100 | 1.3 |
| 1-19 | MAEDPA | 5  | GLM | 95 | NaOH | 100 | 33.6 |
| 1-20 | MAEDPA | 80 | GLM | 20 | NaOH | 100 | 1.2 |
| 1-21 | MAEDPA | 80 | GLM | 20 | NaOH | 100 | 34.8 |

Preparation of 10% by Weight Aqueous Solution of Copolymer 2-1

10% aqueous solution of Copolymer 1-1 was obtained in the same manner as in 10% aqueous solution of Copolymer 2-1 except that MPC was used instead of GLM.

10% aqueous solution of Copolymer 2-1 had a viscosity of 10.5 mPa·s.

Preparation of 10% by Weight Aqueous Solution of Copolymer 2-2

10% aqueous solution of Copolymer 2-2 was obtained in the same manner as in 10% aqueous solution of Copolymer 2-1 except that the neutralization rate was 50%.

10% aqueous solution of Copolymer 2-2 had a viscosity of 4.9 mPa·s.

Preparation of 10% by Weight Aqueous Solution of Copolymer 2-3

10% aqueous solution of Copolymer 2-3 was obtained in the same manner as in 10% aqueous solution of Copolymer 2-1 except that APC was used instead of MPC.

10% aqueous solution of Copolymer 2-3 had a viscosity of 11.1 mPa·s.

Preparation of 10% by Weight Aqueous Solution of Copolymer 2-4

10% aqueous solution of Copolymer 2-4 was obtained in the same manner as in 10% aqueous solution of Copolymer 2-1 except that potassium hydroxide was used instead of sodium hydroxide.

10% aqueous solution of Copolymer 2-4 had a viscosity of 10.5 mPa·s.

Preparation of 10% by Weight Aqueous Solution of Copolymer 2-5

10% aqueous solution of Copolymer 2-5 was obtained in the same manner as in 10% aqueous solution of Copolymer 2-1 except that lithium hydroxide was used instead of sodium hydroxide.

10% aqueous solution of Copolymer 2-5 had a viscosity of 10.9 mPa·s.

Preparation of 10% by Weight Aqueous Solution of Copolymer 2-6

10% aqueous solution of Copolymer 2-6 was obtained in the same manner as in 10% aqueous solution of Copolymer 2-1 except that monoethanol amine (EA) was used instead of sodium hydroxide.

10% aqueous solution of Copolymer 2-6 had a viscosity of 10.5 mPa·s.

Preparation of 10% By Weight Aqueous Solution of Copolymer 2-7

10% aqueous solution of Copolymer 2-7 was obtained in the same manner as in 10% aqueous solution of Copolymer 2-1 except that dimethyl ethanolamine (DMEA) was used instead of sodium hydroxide.

10% aqueous solution of Copolymer 2-7 had a viscosity of 10.6 mPa·s.

Preparation of 10% by Weight Aqueous Solution of Copolymer 2-8

10% aqueous solution of Copolymer 2-8 was obtained in the same manner as in 10% aqueous solution of Copolymer 2-1 except that AEDPA was used instead of MAEDPA.

10% aqueous solution of Copolymer 2-8 had a viscosity of 9.3 mPa·s.

Preparation of 10% by Weight Aqueous Solution of Copolymer 2-9

10% aqueous solution of Copolymer 2-9 was obtained in the same manner as in 10% aqueous solution of Copolymer 2-1 except that the neutralization rate was 40%.

10% aqueous solution of Copolymer 2-9 had a viscosity of 2.3 mPa·s.

Preparation of 10% by Weight Aqueous Solution of Copolymer 2-10

10% aqueous solution of Copolymer 2-10 was obtained in the same manner as in 10% aqueous solution of Copolymer 2-1 except that the addition amounts of MAEDPA, MPC, ethanol, and AIBN were changed to 4.0 g, 16.0 g, 380.0 g, and 4.0 g, respectively.

10% aqueous solution of Copolymer 2-10 had a viscosity of 1.6 mPa·s.

Preparation of 10% by Weight Aqueous Solution of Copolymer 2-11

10% aqueous solution of Copolymer 2-11 was obtained in the same manner as in 10% aqueous solution of Copolymer 2-1 except that the addition amounts of MAEDPA, MPC, and ethanol were changed to 4.6 g, 41.4 g, and 154.0 g, respectively.

10% aqueous solution of Copolymer 2-11 had a viscosity of 29.7 mPa·s.

Preparation of 10% by Weight Aqueous Solution of Copolymer 2-12

10% aqueous solution of Copolymer 2-12 was obtained in the same manner as in 10% aqueous solution of Copolymer 2-1 except that the addition amounts of MAEDPA, MPC, ethanol, and AIBN were changed to 9.0 g, 6.0 g, 285.0 g, and 3.0 g, respectively.

10% aqueous solution of Copolymer 2-12 had a viscosity of 1.5 mPa·s.

Preparation of 10% by Weight Aqueous Solution of Copolymer 2-13

10% aqueous solution of Copolymer 2-13 was obtained in the same manner as in 10% aqueous solution of Copolymer 2-1 except that the addition amounts of MAEDPA, MPC, and ethanol were changed to 27.6 g, 18.4 g, and 154.0 g, respectively.

10% aqueous solution of Copolymer 2-13 had a viscosity of 29.1 mPa·s.

Preparation of 10% by Weight Aqueous Solution of Copolymer 2-14

10% aqueous solution of Copolymer 2-14 was obtained in the same manner as in 10% aqueous solution of Copolymer 2-1 except that the addition amounts of MAEDPA, MPC, ethanol, and AIBN were changed to 6.4 g, 25.6 g, 768.0 g, and 8.0 g, respectively.

10% aqueous solution of Copolymer 2-14 had a viscosity of 1.2 mPa·s.

Preparation of 10% by Weight Aqueous Solution of Copolymer 2-15

10% aqueous solution of Copolymer 2-15 was obtained in the same manner as in 10% aqueous solution of Copolymer 2-1 except that the addition amounts of MAEDPA, MPC, and ethanol were changed to 5.0 g, 45.0 g, and 150.0 g, respectively.

10% aqueous solution of Copolymer 2-15 had a viscosity of 30.5 mPa·s.

Preparation of 10% by Weight Aqueous Solution of Copolymer 2-16

10% aqueous solution of Copolymer 2-16 was obtained in the same manner as in 10% aqueous solution of Copolymer 2-1 except that the addition amounts of MAEDPA, MPC, ethanol, and AIBN were changed to 7.2 g, 4.8 g, 288.0 g, and 3.0 g, respectively.

10% aqueous solution of Copolymer 2-16 had a viscosity of 1.4 mPa·s.

Preparation of 10% by Weight Aqueous Solution of Copolymer 2-17

10% aqueous solution of Copolymer 2-17 was obtained in the same manner as in 10% aqueous solution of Copolymer 2-1 except that the addition amounts of MAEDPA, MPC, and ethanol were changed to 30.0 g, 20.0 g, and 150.0 g, respectively.

10% aqueous solution of Copolymer 2-17 had a viscosity of 34.1 mPa·s.

Preparation of 10% by Weight Aqueous Solution of Copolymer 2-18

10% aqueous solution of Copolymer 2-18 was obtained in the same manner as in 10% aqueous solution of Copolymer 2-1 except that the addition amounts of MAEDPA, MPC, ethanol, and AIBN were changed to 1.6 g, 30.4 g, 768.0 g, and 8.0 g, respectively.

10% aqueous solution of Copolymer 2-18 had a viscosity of 1.3 mPa·s.

Preparation of 10% by Weight Aqueous Solution of Copolymer 2-19

10% aqueous solution of Copolymer 2-19 was obtained in the same manner as in 10% aqueous solution of Copolymer 2-1 except that the addition amounts of MAEDPA, MPC, and ethanol were changed to 2.5 g, 47.5 g, and 150.0 g, respectively.

10% aqueous solution of Copolymer 2-19 had a viscosity of 33.5 mPa·s.

Preparation of 10% by Weight Aqueous Solution of Copolymer 2-20

10% aqueous solution of Copolymer 2-20 was obtained in the same manner as in 10% aqueous solution of Copolymer 2-1 except that the addition amounts of MAEDPA, MPC, ethanol, and AIBN were changed to 9.6 g, 2.4 g, 288.0 g, and 3.0 g, respectively.

10% aqueous solution of Copolymer 2-20 had a viscosity of 1.3 mPa·s.

Preparation of 10% by Weight Aqueous Solution of Copolymer 2-21

10% aqueous solution of Copolymer 2-21 was obtained in the same manner as in 10% aqueous solution of Copolymer 2-1 except that the addition amounts of MAEDPA, MPC, and ethanol were changed to 40.0 g, 10.0 g, and 150.0 g, respectively.

10% aqueous solution of Copolymer 2-21 had a viscosity of 34.2 mPa·s.

In Table 2, the characteristics of Copolymers 2-1 to 2-21 are shown.

TABLE 2

| Copolymer | Monomer | | | | Nuetral-izing agent | Neutral-ization rate | Viscosity (mPa·s) |
| --- | --- | --- | --- | --- | --- | --- | --- |
| | Kind | Content (% by weight) | Kind | Content (% by weight) | | | |
| 2-1 | MAEDPA | 30 | MPC | 70 | NaOH | 100 | 10.5 |
| 2-2 | MAEDPA | 30 | MPC | 70 | NaOH | 50 | 4.9 |

TABLE 2-continued

|  | Monomer | | | | Nuetral- | Neutral- | |
| Copolymer | Kind | Content (% by weight) | Kind | Content (% by weight) | izing agent | ization rate | Viscosity (mPa·s) |
| --- | --- | --- | --- | --- | --- | --- | --- |
| 2-3 | MAEDPA | 30 | APC | 70 | NaOH | 100 | 11.1 |
| 2-4 | MAEDPA | 30 | MPC | 70 | KOH | 100 | 10.5 |
| 2-5 | MAEDPA | 30 | MPC | 70 | LiOH | 100 | 10.9 |
| 2-6 | MAEDPA | 30 | MPC | 70 | EA | 100 | 10.5 |
| 2-7 | MAEDPA | 30 | MPC | 70 | DMEA | 100 | 10.6 |
| 2-8 | AEDPA | 30 | MPC | 70 | NaOH | 100 | 9.3 |
| 2-9 | MAEDPA | 30 | MPC | 70 | NaOH | 40 | 2.3 |
| 2-10 | MAEDPA | 20 | MPC | 80 | NaOH | 100 | 1.6 |
| 2-11 | MAEDPA | 10 | MPC | 90 | NaOH | 100 | 29.7 |
| 2-12 | MAEDPA | 60 | MPC | 40 | NaOH | 100 | 1.5 |
| 2-13 | MAEDPA | 60 | MPC | 40 | NaOH | 100 | 29.1 |
| 2-14 | MAEDPA | 20 | MPC | 80 | NaOH | 100 | 1.3 |
| 2-15 | MAEDPA | 10 | MPC | 90 | NaOH | 100 | 30.5 |
| 2-16 | MAEDPA | 60 | MPC | 40 | NaOH | 100 | 1.4 |
| 2-17 | MAEDPA | 60 | MPC | 40 | NaOH | 100 | 34.1 |
| 2-18 | MAEDPA | 5 | MPC | 95 | NaOH | 100 | 1.3 |
| 2-19 | MAEDPA | 5 | MPC | 95 | NaOH | 100 | 33.5 |
| 2-20 | MAEDPA | 80 | MPC | 20 | NaOH | 100 | 1.3 |
| 2-21 | MAEDPA | 80 | MPC | 20 | NaOH | 100 | 34.2 |

Preparation of 10% by Weight Aqueous Solution of Copolymer 3-1

10% aqueous solution of Copolymer 1-1 was obtained in the same manner as in 10% aqueous solution of Copolymer 3-1 except that DAAM was used instead of GLM.

10% aqueous solution of Copolymer 3-1 had a viscosity of 10.9 mPa·s.

Preparation of 10% by Weight Aqueous Solution of Copolymer 3-2

10% aqueous solution of Copolymer 3-2 was obtained in the same manner as in 10% aqueous solution of Copolymer 3-1 except that the neutralization rate was 50%.

10% aqueous solution of Copolymer 3-2 had a viscosity of 5.2 mPa·s.

Preparation of 10% by Weight Aqueous Solution of Copolymer 3-3

10% aqueous solution of Copolymer 3-1 was obtained in the same manner as in 10% aqueous solution of Copolymer 3-3 except that DAMM was used instead of DAAM.

10% aqueous solution of Copolymer 3-3 had a viscosity of 11.0 mPa·s.

Preparation of 10% by Weight Aqueous Solution of Copolymer 3-4

10% aqueous solution of Copolymer 3-4 was obtained in the same manner as in 10% aqueous solution of Copolymer 3-1 except that potassium hydroxide was used instead of sodium hydroxide.

10% aqueous solution of Copolymer 3-4 had a viscosity of 10.6 mPa·s.

Preparation of 10% by Weight Aqueous Solution of Copolymer 3-5

10% aqueous solution of Copolymer 3-5 was obtained in the same manner as in 10% aqueous solution of Copolymer 3-1 except that lithium hydroxide was used instead of sodium hydroxide.

10% aqueous solution of Copolymer 3-5 had a viscosity of 10.7 mPa·s.

Preparation of 10% by Weight Aqueous Solution of Copolymer 3-6

10% aqueous solution of Copolymer 3-6 was obtained in the same manner as in 10% aqueous solution of Copolymer 3-1 except that monoethanol amine (EA) was used instead of sodium hydroxide.

10% aqueous solution of Copolymer 3-6 had a viscosity of 10.1 mPa·s.

Preparation of 10% by Weight Aqueous Solution of Copolymer 3-7

10% aqueous solution of Copolymer 3-7 was obtained in the same manner as in 10% aqueous solution of Copolymer 3-1 except that dimethyl ethanolamine (DMEA) was used instead of sodium hydroxide.

10% aqueous solution of Copolymer 3-7 had a viscosity of 10.4 mPa·s.

Preparation of 10% by Weight Aqueous Solution of Copolymer 3-8

10% aqueous solution of Copolymer 3-8 was obtained in the same manner as in 10% aqueous solution of Copolymer 3-1 except that AEDPA was used instead of MAEDPA.

10% aqueous solution of Copolymer 3-8 had a viscosity of 9.7 mPa·s.

Preparation of 10% by Weight Aqueous Solution of Copolymer 3-9

10% aqueous solution of Copolymer 3-9 was obtained in the same manner as in 10% aqueous solution of Copolymer 3-1 except that the neutralization rate was 40%.

10% aqueous solution of Copolymer 3-9 had a viscosity of 2.5 mPa·s.

Preparation of 10% by Weight Aqueous Solution of Copolymer 3-10

10% aqueous solution of Copolymer 3-10 was obtained in the same manner as in 10% aqueous solution of Copolymer 3-1 except that the addition amounts of MAEDPA, DAAM, ethanol, and AIBN were changed to 4.0 g, 16.0 g, 380.0 g, and 4.0 g, respectively.

10% aqueous solution of Copolymer 3-10 had a viscosity of 1.6 mPa·s.

Preparation of 10% by Weight Aqueous Solution of Copolymer 3-11

10% aqueous solution of Copolymer 3-11 was obtained in the same manner as in 10% aqueous solution of Copolymer 3-1 except that the addition amounts of MAEDPA, DAAM, and ethanol were changed to 4.6 g, 41.4 g, and 154.0 g, respectively.

10% aqueous solution of Copolymer 3-11 had a viscosity of 29.5 mPa·s.

Preparation of 10% by Weight Aqueous Solution of Copolymer 3-12

10% aqueous solution of Copolymer 3-12 was obtained in the same manner as in 10% aqueous solution of Copolymer 3-1 except that the addition amounts of MAEDPA, DAAM, ethanol, and AIBN were changed to 9.0 g, 6.0 g, 285 0 g, and 3.0 g, respectively.

10% aqueous solution of Copolymer 3-12 had a viscosity of 1.6 mPa·s.

Preparation of 10% by Weight Aqueous Solution of Copolymer 3-13

10% aqueous solution of Copolymer 3-13 was obtained in the same manner as in 10% aqueous solution of Copolymer 3-1 except that the addition amounts of MAEDPA, DAAM, and ethanol were changed to 27.6 g, 18.4 g, and 154.0 g, respectively.

10% aqueous solution of Copolymer 3-13 had a viscosity of 29.5 mPa·s.

Preparation of 10% by Weight Aqueous Solution of Copolymer 3-14

10% aqueous solution of Copolymer 3-14 was obtained in the same manner as in 10% aqueous solution of Copolymer 3-1 except that the addition amounts of MAEDPA, DAAM, ethanol, and AIBN were changed to 6.4 g, 25.6 g, 768 0 g, and 8.0 g, respectively.

10% aqueous solution of Copolymer 3-14 had a viscosity of 1.3 mPa·s.

Preparation of 10% by Weight Aqueous Solution of Copolymer 3-15

10% aqueous solution of Copolymer 3-15 was obtained in the same manner as in 10% aqueous solution of Copolymer 3-1 except that the addition amounts of MAEDPA, DAAM, and ethanol were changed to 5.0 g, 45.0 g, and 150.0 g, respectively.

10% aqueous solution of Copolymer 3-15 had a viscosity of 31.0 mPa·s.

Preparation of 10% by Weight Aqueous Solution of Copolymer 3-16

10% aqueous solution of Copolymer 3-16 was obtained in the same manner as in 10% aqueous solution of Copolymer 3-1 except that the addition amounts of MAEDPA, DAAM, ethanol, and AIBN were changed to 7.2 g, 4.8 g, 288 0 g, and 3.0 g, respectively.

10% aqueous solution of Copolymer 3-16 had a viscosity of 1.2 mPa·s.

Preparation of 10% by Weight Aqueous Solution of Copolymer 3-17

10% aqueous solution of Copolymer 3-17 was obtained in the same manner as in 10% aqueous solution of Copolymer 3-1 except that the addition amounts of MAEDPA, DAAM, and ethanol were changed to 30.0 g, 20.0 g, and 150.0 g, respectively.

10% aqueous solution of Copolymer 3-17 had a viscosity of 34.2 mPa·s.

Preparation of 10% by Weight Aqueous Solution of Copolymer 3-18

10% aqueous solution of Copolymer 3-18 was obtained in the same manner as in 10% aqueous solution of Copolymer 3-1 except that the addition amounts of MAEDPA, DAAM, ethanol, and AIBN were changed to 1.6 g, 30.4 g, 768 0 g, and 8.0 g, respectively.

10% aqueous solution of Copolymer 3-18 had a viscosity of 1.2 mPa·s.

Preparation of 10% by Weight Aqueous Solution of Copolymer 3-19

10% aqueous solution of Copolymer 3-19 was obtained in the same manner as in 10% aqueous solution of Copolymer 3-1 except that the addition amounts of MAEDPA, DAAM, and ethanol were changed to 2.5 g, 47.5 g, and 150.0 g, respectively.

10% aqueous solution of Copolymer 3-19 had a viscosity of 33.4 mPa·s.

Preparation of 10% by Weight Aqueous Solution of Copolymer 3-20

10% aqueous solution of Copolymer 3-20 was obtained in the same manner as in 10% aqueous solution of Copolymer 3-1 except that the addition amounts of MAEDPA, DAAM, ethanol, and AIBN were changed to 9.6 g, 2.4 g, 288.0 g, and 3.0 g, respectively.

10% aqueous solution of Copolymer 3-20 had a viscosity of 1.1 mPa·s.

Preparation of 10% by Weight Aqueous Solution of Copolymer 3-21

10% aqueous solution of Copolymer 3-21 was obtained in the same manner as in 10% aqueous solution of Copolymer 3-1 except that the addition amounts of MAEDPA, DAAM, and ethanol were changed to 40.0 g, 10.0 g, and 150.0 g, respectively.

10% aqueous solution of Copolymer 3-21 had a viscosity of 34.5 mPa·s.

In Table 3, the characteristics of Copolymers 3-1 to 3-21 are shown.

TABLE 3

| Copolymer | Monomer | | | | Neutralizing agent | Neutralization rate | Viscosity (mPa · s) |
| --- | --- | --- | --- | --- | --- | --- | --- |
| | Kind | Content (% by weight) | Kind | Content (% by weight) | | | |
| 3-1 | MAEDPA | 30 | DAAM | 70 | NaOH | 100 | 10.9 |
| 3-2 | MAEDPA | 30 | DAAM | 70 | NaOH | 50 | 5.2 |
| 3-3 | MAEDPA | 30 | DAAM | 70 | NaOH | 100 | 11.0 |
| 3-4 | MAEDPA | 30 | DAAM | 70 | KOH | 100 | 10.6 |
| 3-5 | MAEDPA | 30 | DAAM | 70 | LiOH | 100 | 10.7 |
| 3-6 | MAEDPA | 30 | DAAM | 70 | EA | 100 | 10.1 |
| 3-7 | MAEDPA | 30 | DAAM | 70 | DMEA | 100 | 10.4 |
| 3-8 | AEDPA | 30 | DAAM | 70 | NaOH | 100 | 9.7 |
| 3-9 | MAEDPA | 30 | DAAM | 70 | NaOH | 40 | 2.5 |
| 3-10 | MAEDPA | 20 | DAAM | 80 | NaOH | 100 | 1.6 |
| 3-11 | MAEDPA | 10 | DAAM | 90 | NaOH | 100 | 29.5 |
| 3-12 | MAEDPA | 60 | DAAM | 40 | NaOH | 100 | 1.6 |
| 3-13 | MAEDPA | 60 | DAAM | 40 | NaOH | 100 | 29.5 |
| 3-14 | MAEDPA | 20 | DAAM | 80 | NaOH | 100 | 1.3 |
| 3-15 | MAEDPA | 10 | DAAM | 90 | NaOH | 100 | 31.0 |
| 3-16 | MAEDPA | 60 | DAAM | 40 | NaOH | 100 | 1.2 |

TABLE 3-continued

| Copolymer | Monomer Kind | Content (% by weight) | Kind | Content (% by weight) | Nuetralizing agent | Neutralization rate | Viscosity (mPa · s) |
|---|---|---|---|---|---|---|---|
| 3-17 | MAEDPA | 60 | DAAM | 40 | NaOH | 100 | 34.2 |
| 3-18 | MAEDPA | 5 | DAAM | 95 | NaOH | 100 | 1.2 |
| 3-19 | MAEDPA | 5 | DAAM | 95 | NaOH | 100 | 33.4 |
| 3-20 | MAEDPA | 80 | DAAM | 20 | NaOH | 100 | 1.1 |
| 3-21 | MAEDPA | 80 | DAAM | 20 | NaOH | 100 | 34.5 |

Preparation of 10% by Weight Aqueous Solution of Copolymer 4-1

A liquid mixture of 100 g of maleic acid, 100 g of styrene, 500 g of water, and 15 g of ammonium persulfate were charged in a flask to obtain a uniform solution. Next, after blowing nitrogen thereinto for 30 minutes, the system was heated to 80° C. to 90° C. and 2.0 g of AIBN was added thereto to conduct polymerization reaction for five hours. Moreover, subsequent to solvent removal by using an evaporator, the concentration of the resultant was adjusted to about 10% by dilution with water followed by neutralization by sodium hydoxide in such a manner that the neutralization rate was 100%. Next, the resultant was refined by dialysis membrane for three days, the concentration thereof was adjusted to 10% to obtain 10% aqueous solution of Copolymer 4-1.

10% aqueous solution of Copolymer 4-1 had a viscosity of 13.5 mPa·s.

Preparation of 10% by Weight Aqueous Solution of Copolymer 4-2

10% aqueous solution of Copolymer 4-2 was obtained in the same manner as in 10% aqueous solution of Copolymer 4-1 except that MAEDPA was used instead of maleic acid.

10% aqueous solution of Copolymer 4-2 had a viscosity of 14.4 mPa·s.

Preparation of 10% by Weight Aqueous Solution of Copolymer 4-3

10% aqueous solution of Copolymer 4-3 was obtained in the same manner as in 10% aqueous solution of Copolymer 1-1 except that GLM was used instead of styrene.

10% aqueous solution of Copolymer 4-3 had a viscosity of 14.1 mPa·s.

Preparation of 10% by Weight Aqueous Solution of Copolymer 4-4

10% aqueous solution of Copolymer 4-4 was obtained in the same manner as in 10% aqueous solution of Copolymer 1-1 except that MPC was used instead of styrene.

10% aqueous solution of Copolymer 4-4 had a viscosity of 14.1 mPa·s.

Preparation of 10% by Weight Aqueous Solution of Copolymer 4-5

10% aqueous solution of Copolymer 4-5 was obtained in the same manner as in 10% aqueous solution of Copolymer 1-1 except that DAAM was used instead of styrene.

10% aqueous solution of Copolymer 4-5 had a viscosity of 14.1 mPa·s.

In Table 4, the characteristics of Copolymers 4-1 to 4-5 are shown.

TABLE 4

| Copolymer | Monomer Kind | Content (% by weight) | Kind | Content (% by weight) | Nuetralizing agent | Neutralization rate | Viscosity (mPa · s) |
|---|---|---|---|---|---|---|---|
| 4-1 | Maleic acid | 50 | Styrene | 50 | NaOH | 100 | 13.5 |
| 4-2 | MAEDPA | 50 | Styrene | 50 | NaOH | 100 | 14.4 |
| 4-3 | Maleic acid | 50 | GLM | 50 | NaOH | 100 | 14.1 |
| 4-4 | Maleic acid | 50 | MPC | 50 | NaOH | 100 | 14.1 |
| 4-5 | Maleic acid | 50 | DAAM | 50 | NaOH | 100 | 14.1 |

Preparation of Pigment Dispersion Element 1-1

16 parts of carbon black (NIPEX150, manufactured by Degussa AG), 40 parts of 10% by weight aqueous solution of Copolymer 1-1, 4 parts of polyvinyl pyrolidone having a K value of 17, and 40 parts of pure water were preliminarily mixed followed by circulation dispersion at a peripheral speed of 10 m/s for 10 minutes using a disc type bead mill KDL type (manufacture by Shinmaru Enterprises Corporation) to obtain Pigment dispersion element 1-1. The used media were zirconia balls having a diameter of 0.1 mm.

Preparation of Pigment Dispersion Element 1-2

Pigment dispersion element 1-2 was obtained in the same manner as in Pigment dispersion element 1-1 except that the addition amounts of 10% by weight aqueous solution of Copolymer 1-1 and pure water were changed to 20 parts and 60 parts, respectively.

Preparation of Pigment Dispersion Element 1-3

Pigment dispersion element 1-3 was obtained in the same manner as in Pigment dispersion element 1-1 except that the addition amounts of 10% by weight aqueous solution of Copolymer 1-1 and pure water were changed to 80 parts and 0 parts, respectively.

Preparation of Pigment Dispersion Element 1-4

Pigment dispersion element 1-4 was obtained in the same manner as in Pigment dispersion element 1-1 except that the addition amounts of polyvinyl pyrolidone having a K value of 17 and pure water were changed to 2 parts and 42 parts, respectively.

Preparation of Pigment Dispersion Element 1-5

Pigment dispersion element 1-5 was obtained in the same manner as in Pigment dispersion element 1-1 except that the addition amounts of polyvinyl pyrolidone having a K value of 17 and pure water were changed to 16 parts and 28 parts, respectively.

Preparation of Pigment Dispersion Element 1-6

Pigment dispersion element 1-6 was obtained in the same manner as in Pigment dispersion element 1-1 except that the addition amount of polyvinyl pyrolidone having a K value of 17 was changed to polyvinyl pyrolidone having a K value of 12.

Preparation of Pigment Dispersion Element 1-7

Pigment dispersion element 1-7 was obtained in the same manner as in Pigment dispersion element 1-1 except that the addition amount of polyvinyl pyrolidone having a K value of 17 was changed to polyvinyl pyrolidone having a K value of 30.

Preparation of Pigment Dispersion Element 1-8

Pigment dispersion element 1-8 was obtained in the same manner as in Pigment dispersion element 1-1 except that Pigment Blue 15:3 was used instead of carbon black.

Preparation of Pigment Dispersion Element 1-9

Pigment dispersion element 1-9 was obtained in the same manner as in Pigment dispersion element 1-1 except that Pigment Red 122 was used instead of carbon black.

Preparation of Pigment Dispersion Element 1-10

Pigment dispersion element 1-10 was obtained in the same manner as in Pigment dispersion element 1-1 except that Pigment Yellow 74 was used instead of carbon black.

Preparation of Pigment Dispersion Elements 1-11 to 1-17

Pigment dispersion elements 1-11 to 1-17 were obtained in the same manner as in Pigment dispersion element 1-1 except that 10% by weight aqueous solutions of Copolymers 1-2 to 1-8 were used instead of 10% by weight aqueous solution of Copolymer 1-1.

Preparation of Pigment Dispersion Element 1-18

Pigment dispersion element 1-18 was obtained in the same manner as in Pigment dispersion element 1-17 except that Pigment Blue 15:3 was used instead of carbon black.

Preparation of Pigment Dispersion Element 1-19

Pigment dispersion element 1-19 was obtained in the same manner as in Pigment dispersion element 1-17 except that Pigment Red 122 was used instead of carbon black.

Preparation of Pigment Dispersion Element 1-20

Pigment dispersion element 1-20 was obtained in the same manner as in Pigment dispersion element 1-17 except that Pigment Yellow 74 was used instead of carbon black.

Preparation of Pigment Dispersion Elements 1-21 to 1-33

Pigment dispersion elements 1-21 to 1-33 were obtained in the same manner as in Pigment dispersion element 1-1 except that 10% by weight aqueous solutions of Copolymers 1-9 to 1-21 were used instead of 10% by weight aqueous solution of Copolymer 1-1.

Preparation of Pigment Dispersion Element 2-1

Pigment dispersion element 2-1 was obtained in the same manner as in Pigment dispersion element 1-1 except that 10% by weight aqueous solutions of Copolymer 2-1 were used instead of 10% by weight aqueous solution of Copolymer 1-1.

Preparation of Pigment Dispersion Element 2-2

Pigment dispersion element 2-2 was obtained in the same manner as in Pigment dispersion element 2-1 except that the addition amounts of 10% by weight aqueous solution of Copolymer 2-1 and pure water were changed to 20 parts and 60 parts, respectively.

Preparation of Pigment Dispersion Element 2-3

Pigment dispersion element 2-3 was obtained in the same manner as in Pigment dispersion element 2-1 except that the addition amounts of 10% by weight aqueous solution of Copolymer 2-1 and pure water were changed to 80 parts and 0 parts, respectively.

Preparation of Pigment Dispersion Element 2-4

Pigment dispersion element 2-4 was obtained in the same manner as in Pigment dispersion element 2-1 except that the addition amounts of polyvinyl pyrolidone having a K value of 17 and pure water were changed to 2 parts and 42 parts, respectively.

Preparation of Pigment Dispersion Element 2-5

Pigment dispersion element 2-5 was obtained in the same manner as in Pigment dispersion element 2-1 except that the addition amounts of polyvinyl pyrolidone having a K value of 17 and pure water were changed to 16 parts and 28 parts, respectively.

Preparation of Pigment Dispersion Element 2-6

Pigment dispersion element 2-6 was obtained in the same manner as in Pigment dispersion element 2-1 except that the addition amount of polyvinyl pyrolidone having a K value of 17 was changed to polyvinyl pyrolidone having a K value of 12.

Preparation of Pigment Dispersion Element 2-7

Pigment dispersion element 2-7 was obtained in the same manner as in Pigment dispersion element 2-1 except that the addition amount of polyvinyl pyrolidone having a K value of 17 was changed to polyvinyl pyrolidone having a K value of 30.

Preparation of Pigment Dispersion Element 2-8

Pigment dispersion element 2-8 was obtained in the same manner as in Pigment dispersion element 2-1 except that Pigment Blue 15:3 was used instead of carbon black.

Preparation of Pigment Dispersion Element 2-9

Pigment dispersion element 2-9 was obtained in the same manner as in Pigment dispersion element 2-1 except that Pigment Red 122 was used instead of carbon black.

Preparation of Pigment Dispersion Element 2-10

Pigment dispersion element 2-10 was obtained in the same manner as in Pigment dispersion element 2-1 except that Pigment Yellow 74 was used instead of carbon black.

Preparation of Pigment Dispersion Elements 2-11 to 2-17

Pigment dispersion elements 2-11 to 2-17 were obtained in the same manner as in Pigment dispersion element 2-1 except that 10% by weight aqueous solutions of Copolymers 2-2 to 2-8 were used instead of 10% by weight aqueous solution of Copolymer 2-1.

Preparation of Pigment Dispersion Element 2-18

Pigment dispersion element 2-18 was obtained in the same manner as in Pigment dispersion element 2-17 except that Pigment Blue 15:3 was used instead of carbon black.

Preparation of Pigment Dispersion Element 2-19

Pigment dispersion element 2-19 was obtained in the same manner as in Pigment dispersion element 2-17 except that Pigment Red 122 was used instead of carbon black.

Preparation of Pigment Dispersion Element 2-20

Pigment dispersion element 2-20 was obtained in the same manner as in Pigment dispersion element 2-17 except that Pigment Yellow 74 was used instead of carbon black.

Preparation of Pigment Dispersion Elements 2-21 to 2-33

Pigment dispersion elements 2-21 to 2-33 were obtained in the same manner as in Pigment dispersion element 2-1 except that 10% by weight aqueous solutions of Copolymers 2-9 to 2-21 were used instead of 10% by weight aqueous solution of Copolymer 2-1.

Preparation of Pigment Dispersion Element 3-1

Pigment dispersion element 3-1 was obtained in the same manner as in Pigment dispersion element 1-1 except that 10% by weight aqueous solutions of Copolymer 3-1 were used instead of 10% by weight aqueous solution of Copolymer 1-1.

Preparation of Pigment Dispersion Element 3-2

Pigment dispersion element 3-2 was obtained in the same manner as in Pigment dispersion element 3-1 except that the addition amounts of 10% by weight aqueous solution of Copolymer 3-1 and pure water were changed to 20 parts and 60 parts, respectively.

Preparation of Pigment Dispersion Element 3-3

Pigment dispersion element 3-3 was obtained in the same manner as in Pigment dispersion element 3-1 except that the addition amounts of 10% by weight aqueous solution of Copolymer 3-1 and pure water were changed to 80 parts and 0 parts, respectively.

Preparation of Pigment Dispersion Element 3-4

Pigment dispersion element 3-4 was obtained in the same manner as in Pigment dispersion element 3-1 except that the addition amounts of polyvinyl pyrolidone having a K value of 17 and pure water were changed to 2 parts and 42 parts, respectively.

Preparation of Pigment Dispersion Element 3-5

Pigment dispersion element 3-5 was obtained in the same manner as in Pigment dispersion element 3-1 except that the addition amounts of polyvinyl pyrolidone having a K value of 17 and pure water were changed to 16 parts and 28 parts, respectively.

Preparation of Pigment Dispersion Element 3-6

Pigment dispersion element 3-6 was obtained in the same manner as in Pigment dispersion element 3-1 except that the addition amount of polyvinyl pyrolidone having a K value of 17 was changed to polyvinyl pyrolidone having a K value of 12.

Preparation of Pigment Dispersion Element 3-7

Pigment dispersion element 3-7 was obtained in the same manner as in Pigment dispersion element 3-1 except that the addition amount of polyvinyl pyrolidone having a K value of 17 was changed to polyvinyl pyrolidone having a K value of 30.

Preparation of Pigment Dispersion Element 3-8

Pigment dispersion element 3-8 was obtained in the same manner as in Pigment dispersion element 3-1 except that Pigment Blue 15:3 was used instead of carbon black.

Preparation of Pigment Dispersion Element 3-9

Pigment dispersion element 3-9 was obtained in the same manner as in Pigment dispersion element 3-1 except that Pigment Red 122 was used instead of carbon black.

Preparation of Pigment Dispersion Element 3-10

Pigment dispersion element 3-10 was obtained in the same manner as in Pigment dispersion element 3-1 except that Pigment Yellow 74 was used instead of carbon black.

Preparation of Pigment Dispersion Elements 3-11 to 3-17

Pigment dispersion elements 3-11 to 3-17 were obtained in the same manner as in Pigment dispersion element 3-1 except that 10% by weight aqueous solutions of Copolymers 3-2 to 3-8 were used instead of 10% by weight aqueous solution of Copolymer 3-1.

Preparation of Pigment Dispersion Element 3-18

Pigment dispersion element 3-18 was obtained in the same manner as in Pigment dispersion element 3-17 except that Pigment Blue 15:3 was used instead of carbon black.

Preparation of Pigment Dispersion Element 3-19

Pigment dispersion element 3-19 was obtained in the same manner as in Pigment dispersion element 3-17 except that Pigment Red 122 was used instead of carbon black.

Preparation of Pigment Dispersion Element 3-20

Pigment dispersion element 3-20 was obtained in the same manner as in Pigment dispersion element 3-17 except that Pigment Yellow 74 was used instead of carbon black.

Preparation of Pigment Dispersion Elements 3-21 to 3-33

Pigment dispersion elements 3-21 to 3-33 were obtained in the same manner as in Pigment dispersion element 3-1 except that 10% by weight aqueous solutions of Copolymers 3-9 to 3-21 were used instead of 10% by weight aqueous solution of Copolymer 3-1.

Preparation of Pigment Dispersion Element 4-1

Pigment dispersion element 4-1 was obtained in the same manner as in Pigment dispersion element 1-1 except that 10% by weight aqueous solution of Copolymer 4-1 was used instead of 10% by weight aqueous solution of Copolymer 1-1 and the addition amounts of polyvinyl pyrolidone having a K value of 17 and pure water were changed to 0 parts and 44 parts, respectively.

Preparation of Pigment Dispersion Element 4-2

Pigment dispersion element 4-2 was obtained in the same manner as in Pigment dispersion element 4-1 except that Pigment Blue 15:3 was used instead of carbon black.

Preparation of Pigment Dispersion Element 4-3

Pigment dispersion element 4-3 was obtained in the same manner as in Pigment dispersion element 4-1 except that Pigment Red 122 was used instead of carbon black.

Preparation of Pigment Dispersion Element 4-4 Pigment dispersion element 4-4 was obtained in the same manner as in Pigment dispersion element 4-1 except that Pigment Yellow 74 was used instead of carbon black.

Preparation of Pigment Dispersion Elements 4-5 to 4-8

Pigment dispersion elements 4-5 to 4-8 were obtained in the same manner as in Pigment dispersion element 4-1 except that 10% by weight aqueous solutions of Copolymers 4-2 to 4-5 were used instead of 10% by weight aqueous solution of Copolymer 4-1.

Preparation of Pigment Dispersion Element 4-9

Pigment dispersion element 4-9 was obtained in the same manner as in Pigment dispersion element 1-1 except that the addition amounts of polyvinyl pyrolidone having a K value of 17 and pure water were changed to 0 parts and 44 parts, respectively.

Preparation of Pigment Dispersion Element 4-10

Pigment dispersion element 4-10 was obtained in the same manner as in Pigment dispersion element 2-1 except that the addition amounts of polyvinyl pyrolidone having a K value of 17 and pure water were changed to 0 parts and 44 parts, respectively.

Preparation of Pigment Dispersion Element 4-11

Pigment dispersion element 4-11 was obtained in the same manner as in Pigment dispersion element 3-1 except that the addition amounts of polyvinyl pyrolidone having a K value of 17 and pure water were changed to 0 parts and 44 parts, respectively.

Preparation of Pigment Dispersion Elements 4-12 to 4-16

Pigment dispersion elements 4-12 to 4-16 were obtained in the same manner as in Pigment dispersion element 1-1 except that 10% by weight aqueous solutions of Copolymers 4-1 to 4-5 were used instead of 10% by weight aqueous solution of Copolymer 1-1.

Example 1-1

50.0 parts of Pigment dispersion element 1-1, 15.0 parts of 1,3-butane diol, 20.0 parts of Equamide™ B100 (manufactured by Idemitsu Kosan Co., Ltd.), 1.0 part of 2-ethyl-1,3-hexane diol, 1.0 part of 2,2,4-trimethyl-1,3-pentane diol, 2.5 parts of polyoxyethylene perfluoroalkyl ether (FS-300, manufactured by E. I. du Pont de Nemours and Company) having a component content of 40%, and 10.5 parts of pure water were mixed and stirred for 30 minutes to obtain an inkjet ink.

Examples 1-2 to 1-7

Inkjet inks were obtained in the same manner as in Example 1-1 except that Pigment dispersion elements 1-2 to 1-7 were used instead of Pigment dispersion element 1-1.

Example 1-8

An inkjet ink was obtained in the same manner as in Example 1-1 except that 6.0 parts of acrylic-silicone-based resin emulsion (POLYSOL® ROY6312, manufactured by SHOWA HIGHPOLYMER CO., LTD.) having a volume median diameter D50 of 171 nm with a component content of 40% and 4.5 parts of pure water were used instead of 10.5 parts of pure water Example 1-9

40.0 parts of Pigment dispersion element 1-8, 15.0 parts of 1,3-butane diol, 20.0 parts of Equamide™ B100 (manufactured by Idemitsu Kosan Co., Ltd.), 2.0 parts of 2-ethyl-1,3-hexane diol, 1.0 part of silicone-based surfactant (KF-643, manufactured by Shin-Etsu Chemical Co., Ltd.), 2.5 parts of polyoxyethylene perfluoroalkyl ether (FS-300, E. I. du Pont de Nemours and Company) having a component content of 40%, and 19.5 parts of pure water were mixed and stirred for 30 minutes to obtain an inkjet ink.

Examples 1-10 and 1-11

Inkjet inks were obtained in the same manner as in Example 1-9 except that Pigment dispersion elements 1-9 and 1-10 were used instead of Pigment dispersion element 1-8.

Examples 1-12 to 1-18

Inkjet inks were obtained in the same manner as in Example 1-1 except that Pigment dispersion elements 1-11 to 1-17 were used instead of Pigment dispersion element 1-1.

Example 1-19

An inkjet ink was obtained in the same manner as in Example 1-8 except that Pigment dispersion element 1-17 was used instead of Pigment dispersion element 1-1.

Examples 1-20 to 1-22

Inkjet inks were obtained in the same manner as in Example 1-9 except that Pigment dispersion elements 1-18 to 1-20 were used instead of Pigment dispersion element 1-8.

Examples 1-23 to 1-35

Inkjet inks were obtained in the same manner as in Example 1-1 except that Pigment dispersion elements 1-21 to 1-33 were used instead of Pigment dispersion element 1-1.

Example 1-36

An inkjet ink was obtained in the same manner as in Example 1-1 except that 0.4 parts of polyvinyl pyrolidone having a K value of 17 and 10.1 parts of pure water were used instead of 10.5 parts of pure water.

Example 1-37

An inkjet ink was obtained in the same manner as in Example 1-1 except that 2.0 parts of polyvinyl pyrolidone having a K value of 17 and 8.5 parts of pure water were used instead of 10.5 parts of pure water.

Example 1-38

An inkjet ink was obtained in the same manner as in Example 1-1 except that 4.0 parts of polyvinyl pyrolidone having a K value of 17 and 6.5 parts of pure water were used instead of 10.5 parts of pure water.

Example 1-39

An inkjet ink was obtained in the same manner as in Example 1-1 except that 8.0 parts of polyvinyl pyrolidone having a K value of 17 and 2.5 parts of pure water were used instead of 10.5 parts of pure water.

Example 1-40

40.0 parts of Pigment dispersion element 1-8, 2.0 parts of polyvinyl pyrolidone having a K value of 17, 15.0 parts of 1,3-butane diol, 20.0 parts of Equamide™ B100 (manufactured by Idemitsu Kosan Co., Ltd.), 2.0 parts of 2-ethyl-1,3-hexane diol, 2.5 parts of polyoxyethylene perfluoroalkyl ether (FS-300, manufactured by E. I. du Pont de Nemours and Company) having a component content of 40%, and 17.5 parts of pure water were mixed and stirred for 30 minutes to obtain an inkjet ink.

Examples 1-41 and 1-42

Inkjet inks were obtained in the same manner as in Example 1-40 except that Pigment dispersion elements 1-9 and 1-10 were used instead of Pigment dispersion element 1-8.

Example 1-43

50.0 parts of Pigment dispersion element 1-1, 15.0 parts of 1,3-butane diol, 20.0 parts of Oxetane EHO (manufactured by Ube Industries, Ltd.), 1.0 part of 2-ethyl-1,3-hexane diol, 1.0 part of 2,2,4-trimethyl-1,3-pentane diol, 2.5 parts of polyoxyethylene perfluoroalkyl ether (FS-300, manufactured by E. I. du Pont de Nemours and Company) having a component content of 40%, 10.0 parts of urethane-based resin emulsion (UA-368T, manufactured by SANYOKASEI CO., LTD.) having a volume median diameter D50 of 230 nm with a content component of 50%, and 0.5 parts of pure water were mixed and stirred for 30 minutes to obtain an inkjet ink.

Example 1-44

50.0 parts of Pigment dispersion element 1-11, 15.0 parts of 1,3-butane diol, 20.0 parts of Oxetane EHO (manufactured by Ube Industries, Ltd.), 1.0 part of 2-ethyl-1,3-hexane diol, 1.0 part of 2,2,4-trimethyl-1,3-pentane diol, 2.5 parts of polyoxyethylene perfluoroalkyl ether (FS-300, manufactured by E. I. du Pont de Nemours and Company) having a component content of 40%, 6.0 parts of acrylic-styrene-based emulsion (5400EF, manufactured by DIC Corporation) having a volume median diameter D50 of 200 nm with a content component of 55%, and 4.5 parts of pure water were mixed and stirred for 30 minutes to obtain an inkjet ink.

Example 1-45

An inkjet ink was obtained in the same manner as in Example 1-43 except that Pigment dispersion element 1-12 and urethane-based emulsion (UX-485, manufactured by SANYOKASEI CO., LTD.) having a volume median diameter D50 of 120 nm with a content component of 40% were used instead of Pigment dispersion element 1-1 and urethane-based emulsion (UA-368T, manufactured by SANYOKASEI CO., LTD.).

Example 1-46

50.0 parts of Pigment dispersion element 1-13, 15.0 parts of 1,3-butane diol, 20.0 parts of Oxetane EHO (manufactured by Ube Industries, Ltd.), 1.0 part of 2-ethyl-1,3-hexane diol, 1.0 part of 2,2,4-trimethyl-1,3-pentane diol, 2.5 parts of polyoxyethylene perfluoroalkyl ether (FS-300, manufactured by E. I. du Pont de Nemours and Company) having a component content of 30%, 7.5 parts of urethane-based resin emulsion (UA-200, manufactured by SANYOKASEI CO., LTD.) having a volume median diameter D50 of 70 nm with a content component of 40%, and 3.0 parts of pure water were mixed and stirred for 30 minutes to obtain an inkjet ink.

Example 1-47

An inkjet ink was obtained in the same manner as in Example 1-43 except that water was used instead of urethane-based resin emulsion (UA-368T, manufactured by SANYOKASEI CO., LTD.).

Example 1-48

An inkjet ink was obtained in the same manner as in Example 1-43 except that acrylic-styrene-based resin emulsion (40-418EF, manufactured by DIC Corporation) having a volume median diameter D50 of 280 nm with a content component of 56% was used instead of urethane-based resin emulsion (UA-368T, manufactured by SANYOKASEI CO., LTD.).

Example 1-49

An inkjet ink was obtained in the same manner as in Example 1-43 except that acrylic-styrene-based resin emulsion (QE-1042, manufactured by SEIKO PMC CORPORATION) having a volume median diameter D50 of 40 nm with a content component of 40% was used instead of urethane-based resin emulsion (UA-368T, manufactured by SANYOKASEI CO., LTD.).

Example 1-50

An inkjet ink was obtained in the same manner as in Example 1-43 except that urethane-based resin emulsion (UWS-145, manufactured by SANYOKASEI CO., LTD.) having a volume median diameter D50 of 20 nm with a content component of 35% was used instead of urethane-based resin emulsion (UA-368T, manufactured by SANYOKASEI CO., LTD.).

Example 2-1

An inkjet ink was obtained in the same manner as in Example 1-1 except that Pigment dispersion element 2-1 was used instead of Pigment dispersion element 1-1.

Examples 2-2 to 2-7

Inkjet inks were obtained in the same manner as in Example 2-1 except that Pigment dispersion elements 2-2 to 2-7 were used instead of Pigment dispersion element 2-1.

Example 2-8

An inkjet ink was obtained in the same manner as in Example 2-1 except that 6.0 parts of acrylic-silicone-based resin emulsion (POLYSOL® ROY6312, manufactured by SHOWA HIGHPOLYMER CO., LTD.) having a volume median diameter D50 of 171 nm with a component content of 40% and 4.5 parts of pure water were used instead of 10.5 parts of pure water Example 2-9

40.0 parts of Pigment dispersion element 2-8, 15.0 parts of 1,3-butane diol, 20.0 parts of Equamide™ B100 (manufactured by Idemitsu Kosan Co., Ltd.), 2.0 parts of 2-ethyl-1,3-hexane diol, 1.0 part of silicone-based surfactant (KF-643, manufactured by Shin-Etsu Chemical Co., Ltd.), 2.5 parts of polyoxyethylene perfluoroalkyl ether (FS-300, manufactured by E. I. du Pont de Nemours and Company) having a component content of 40%, and 19.5 parts of pure water were mixed and stirred for 30 minutes to obtain an inkjet ink.

Examples 2-10 and 2-11

Inkjet inks were obtained in the same manner as in Example 2-9 except that Pigment dispersion elements 2-9 and 2-10 were used instead of Pigment dispersion element 2-8.

Examples 2-12 to 2-18

Inkjet inks were obtained in the same manner as in Example 2-1 except that Pigment dispersion elements 2-11 to 2-17 were used instead of Pigment dispersion element 2-1.

Example 2-19

An inkjet ink was obtained in the same manner as in Example 2-8 except that Pigment dispersion element 2-17 was used instead of Pigment dispersion element 2-1.

Examples 2-20 to 2-22

Inkjet inks were obtained in the same manner as in Example 2-9 except that Pigment dispersion elements 2-18 to 2-20 were used instead of Pigment dispersion element 2-8.

Examples 2-23 to 2-35

Inkjet inks were obtained in the same manner as in Example 2-1 except that Pigment dispersion elements 2-21 to 2-33 were used instead of Pigment dispersion element 2-1.

Example 2-36

An inkjet ink was obtained in the same manner as in Example 2-1 except that 0.4 parts of polyvinyl pyrolidone having a K value of 17 and 10.1 parts of pure water were used instead of 10.5 parts of pure water.

Example 2-37

An inkjet ink was obtained in the same manner as in Example 2-1 except that 2.0 parts of polyvinyl pyrolidone having a K value of 17 and 8.5 parts of pure water were used instead of 10.5 parts of pure water.

Example 2-38

An inkjet ink was obtained in the same manner as in Example 2-1 except that 4.0 parts of polyvinyl pyrolidone having a K value of 17 and 6.5 parts of pure water were used instead of 10.5 parts of pure water.

Example 2-39

An inkjet ink was obtained in the same manner as in Example 2-1 except that 8.0 parts of polyvinyl pyrolidone having a K value of 17 and 2.5 parts of pure water were used instead of 10.5 parts of pure water.

Example 2-40

40.0 parts of Pigment dispersion element 1-8, 2.0 parts of polyvinyl pyrolidone having a K value of 17, 15.0 parts of 1,3-butane diol, 20.0 parts of Equamide™ B100 (manufactured by Idemitsu Kosan Co., Ltd.), 2.0 parts of 2-ethyl-1,3-hexane diol, 2.5 parts of polyoxyethylene perfluoroalkyl ether (FS-300, manufactured by E. I. du Pont de Nemours and Company) having a component content of 40%, and 17.5 parts of pure water were mixed and stirred for 30 minutes to obtain an inkjet ink.

Examples 2-41 and 2-42

Inkjet inks were obtained in the same manner as in Example 2-40 except that Pigment dispersion elements 2-9 and 2-10 were used instead of Pigment dispersion element 2-8.

Example 2-43

An inkjet ink was obtained in the same manner as in Example 1-43 except that Pigment dispersion element 2-1 was used instead of Pigment dispersion element 1-1.

Example 2-44

An inkjet ink was obtained in the same manner as in Example 1-44 except that Pigment dispersion element 2-11 was used instead of Pigment dispersion element 1-11.

Example 2-45

An inkjet ink was obtained in the same manner as in Example 1-45 except that Pigment dispersion element 2-12 was used instead of Pigment dispersion element 1-12.

Example 2-46

An inkjet ink was obtained in the same manner as in Example 1-46 except that Pigment dispersion element 2-13 was used instead of Pigment dispersion element 1-13.

Examples 2-47 to 2-50

Inkjet inks were obtained in the same manner as in Examples 1-47 to 1-50 except that Pigment dispersion element 2-1 was used instead of Pigment dispersion element 1-1.

Example 3-1

An inkjet ink was obtained in the same manner as in Example 1-1 except that Pigment dispersion element 3-1 was used instead of Pigment dispersion element 1-1.

Examples 3-2 to 3-7

Inkjet inks were obtained in the same manner as in Example 3-1 except that Pigment dispersion elements 3-2 to 3-7 were used instead of Pigment dispersion element 3-1.

Example 3-8

An inkjet ink was obtained in the same manner as in Example 3-1 except that 6.0 parts of acrylic-silicone-based resin emulsion (POLYSOL® ROY6312, manufactured by SHOWA HIGHPOLYMER CO., LTD.) having a volume median diameter D50 of 171 nm with a component content of 40% and 4.5 parts of pure water were used instead of 10.5 parts of pure water

Example 3-9

40.0 parts of Pigment dispersion element 3-8, 15.0 parts of 1,3-butane diol, 20.0 parts of Equamide™ B100 (manufactured by Idemitsu Kosan Co., Ltd.), 2.0 parts of 2-ethyl-1,3-hexane diol, 1.0 part of silicone-based surfactant (KF-643, manufactured by Shin-Etsu Chemical Co., Ltd.), 2.5 parts of polyoxyethylene perfluoroalkyl ether (FS-300, manufactured by E. I. du Pont de Nemours and Company) having a component content of 40%, and 19.5 parts of pure water were mixed and stirred for 30 minutes to obtain an inkjet ink.

Examples 3-10 and 3-11

Inkjet inks were obtained in the same manner as in Example 3-9 except that Pigment dispersion elements 3-9 and 3-10 were used instead of Pigment dispersion element 3-8.

Examples 3-12 to 3-18

Inkjet inks were obtained in the same manner as in Example 3-1 except that Pigment dispersion elements 3-11 to 3-17 were used instead of Pigment dispersion element 3-1.

Example 3-19

An inkjet ink was obtained in the same manner as in Example 3-8 except that Pigment dispersion element 3-1 was used instead of Pigment dispersion element 3-17.

Examples 3-20 to 3-22

Inkjet inks were obtained in the same manner as in Example 3-9 except that Pigment dispersion elements 3-18 to 3-20 were used instead of Pigment dispersion element 3-8.

Examples 3-23 to 3-35

Inkjet inks were obtained in the same manner as in Example 3-1 except that Pigment dispersion elements 3-21 to 3-33 were used instead of Pigment dispersion element 3-1.

Example 3-36

An inkjet ink was obtained in the same manner as in Example 3-1 except that 0.4 parts of polyvinyl pyrolidone having a K value of 17 and 10.1 parts of pure water were used instead of 10.5 parts of pure water.

Example 3-37

An inkjet ink was obtained in the same manner as in Example 3-1 except that 2.0 parts of polyvinyl pyrolidone having a K value of 17 and 8.5 parts of pure water were used instead of 10.5 parts of pure water.

Example 3-38

An inkjet ink was obtained in the same manner as in Example 3-1 except that 4.0 parts of polyvinyl pyrolidone having a K value of 17 and 6.5 parts of pure water were used instead of 10.5 parts of pure water.

Example 3-39

An inkjet ink was obtained in the same manner as in Example 3-1 except that 8.0 parts of polyvinyl pyrolidone having a K value of 17 and 2.5 parts of pure water were used instead of 10.5 parts of pure water.

Example 3-40

40.0 parts of Pigment dispersion element 1-8, 2.0 parts of polyvinyl pyrolidone having a K value of 17, 15.0 parts of 1,3-butane diol, 20.0 parts of Equamide™ B100 (manufactured by Idemitsu Kosan Co., Ltd.), 2.0 parts of 2-ethyl-1,3-hexane diol, 2.5 parts of polyoxyethylene perfluoroalkyl ether (FS-300, manufactured by E. I. du Pont de Nemours and Company) having a component content of 40%, and 17.5 parts of pure water were mixed and stirred for 30 minutes to obtain an inkjet ink.

Examples 3-41 and 3-42

Inkjet inks were obtained in the same manner as in Example 3-40 except that Pigment dispersion elements 3-9 and 3-10 were used instead of Pigment dispersion element 3-8.

Example 3-43

An inkjet ink was obtained in the same manner as in Example 1-43 except that Pigment dispersion element 3-1 was used instead of Pigment dispersion element 1-1.

Example 3-44

An inkjet ink was obtained in the same manner as in Example 1-44 except that Pigment dispersion element 3-11 was used instead of Pigment dispersion element 1-11.

Example 3-45

An inkjet ink was obtained in the same manner as in Example 1-45 except that Pigment dispersion element 3-12 was used instead of Pigment dispersion element 1-12.

Example 3-46

An inkjet ink was obtained in the same manner as in Example 1-46 except that Pigment dispersion element 3-13 was used instead of Pigment dispersion element 1-13.

Examples 3-47 to 3-50

Inkjet inks were obtained in the same manner as in Examples 1-47 to 1-50 except that Pigment dispersion element 3-1 was used instead of Pigment dispersion element 1-1.

Comparative Example 1

An inkjet ink was obtained in the same manner as in Example 1-1 except that Pigment dispersion element 4-1 was used instead of Pigment dispersion element 1-1.

Comparative Examples 2 to 4

Inkjet inks were obtained in the same manner as in Example 1-9 except that Pigment dispersion elements 4-2 to 4-4 were used instead of Pigment dispersion element 1-8.

Comparative Examples 5 to 16

Inkjet inks were obtained in the same manner as in Example 1-1 except that Pigment dispersion elements 4-5 to 4-16 were used instead of Pigment dispersion element 1-1.

Comparative Examples 17 and 18

Inkjet inks were obtained in the same manner as in Comparative Examples 5 and 9 except that Oxetane EHO (manufactured by Ube Industries, Ltd.) was used instead of Equamide™ B100 (manufactured by Idemitsu Kosan Co., Ltd.).

Next, the image density, storage stability, and ejection stability of the inkjet inks were evaluated.

Image Density

An inkjet printer (IPSiO GX5000, manufactured by Ricoh Company Ltd.) was filled with the inkjet ink at 23° C. and 50% RH. Thereafter, a chart on which general symbols of 64 point JIS X 0208 (1997) and 2223 were listed was made by utilizing Microsoft Word 2000 (manufactured by Microsoft Corporation) and printed on plain paper (MyPaper, manufactured by Ricoh Company Ltd.). Moreover, the image density of the symbol portions of the printed surface was measured by using X-Rite 938 (manufactured by X-Rite, Incorporated). The printing mode used: A modified mode in which "Plain Paper—Standard Fast" is modified to "No Color Calibration" from the user setting for plain paper by the driver installed onto the printer. Incidentally, the symbols of JIS X 0208 (1997) and 2223 had squares for the exterior and the inside thereof was entirely painted. Furthermore, the amount of calcium ion eluted from MyPaper (manufactured by Ricoh Company Ltd.) was $4.3 \times 10^{-4}$ g/g.

The black inkjet ink was rated as follows:
AA: Image density is 1.25 or greater
A: 1.20 to less than 1.25
B: 1.15 to less than 1.20
C: 1.10 to less than 1.15
D: less than 1.10

The magenta inkjet ink and cyan inkjet ink were rated as follows:
AA: Image density is 1.00 or greater
A: 0.95 to less than 1.00
B: 0.90 to less than 0.95
C: 0.85 to less than 0.90
D: less than 0.85

The yellow inkjet ink was rated as follows:
AA: Image density is 0.85 or greater
A: 0.80 to less than 0.85
B: 0.75 to less than 0.80
C: 0.70 to less than 0.75
D: less than 0.70

Amount of Eluted Calcium Ion 16 g of plain paper was cut to pieces each having a size of 2.0 cm to 3.0 cm×3.0 cm to 4 cm followed by dipping in 200 g of highly pure water for 40 hours and filtration with a cellulose acetate filter (manufactured by Advantec MFS, Inc.) having a hole size of 0.8 μm to remove foreign objects such as paper dust. Next, the calcium ion contained in the filtrate was quantified by using inductively-coupled plasma (ICP) emission spectrophotometer. The amount of the eluted calcium ion [g/g] was calculated from the concentration of the thus-obtained calcium ion, the mass (200 g) of the highly pure water, and the weight (16 g) of the plain paper.

Storage Stability

An ink cartridge was filled with the inkjet ink and stored at 60° C. for two weeks.

The fluctuation rate (%) of the viscosity after storage to the viscosity before storage was obtained from the following relation: |(Viscosity after Storage)−(Viscosity before Storage)|/(Viscosity before Storage)×100 to evaluate the storage stability of the ink. The viscosity of the ink at 25° C. was measured by using a rotation viscometer (RE500L, Cone plate type, manufactured by TOKI SANGYO CO., LTD.). To be specific, 1.1 mL of the inkjet ink was taken and charged into a sample cup of the viscometer. Next, after the sample cup was mounted onto the viscometer and left still for one minute, the rotor of the viscometer was rotated adjusting the rotation number according to the viscosity of the inkjet ink to read the viscosity one minute after. The fluctuation rate of viscosity was rated as follows:
AA: Less than 3%
A: 3% to less than 6%
B: 6% to less than 10%
C: 10% to less than 20%
D: 20% or greater Ejection Stability After printed matter was printed, the printer was left in an environment of 50° C. for one month with the cap on the printer head. Thereafter, the ejection stability was evaluated by checking the number of cleaning operations to restore the initial ejection status thereof. The rating was as follows:
AA: Initial ejection status sustained with no cleaning operation
A: One to three cleaning operations was required to restore the initial ejection status
B: Four to five
C: Six to Ten
D: 11 or more Image Uniformity An inkjet printer (IPSiO GX5000, manufactured by Ricoh Company Ltd.) was filled with the inkjet ink at 23° C. and 50% RH. Thereafter, a chart on which general symbols of 64 point JIS X 0208 (1997) and 2223 were listed was made by utilizing Microsoft Word 2000 (manufactured by Microsoft Corporation) and printed on coated paper (OK TOP COAT+, manufactured by Oji Paper Co., Ltd.). The symbol portion of the printed surface was visually confirmed to evaluate image uniformity. The printing mode used: A modified mode in which "Plain Paper—Standard Fast" is modified to "No Color Calibration" from the user setting for plain paper by the driver installed onto the printer. Incidentally, the symbols of JIS X 0208 (1997) and 2223 had squares for the exterior and the inside thereof was entirely painted. The rating was as follows:
A: No non-uniformity recognized in the image
B: Slight non-uniformity recognized in the image but causing no practical problem
C: Non-uniformity recognized in the image but causing no practical problem
D: Non-uniformity recognized in the image but causing no practical problem
E: non-uniformity clearly recognized in the image but causing no practical problem Next, the evaluation results of image density, storage stability, and ejection stability of the inkjet inks are shown in Tables 5 to 0.8

TABLE 5

| Example | Pigment dispersion element | Copolymer | Image density | Storage stability | Ejection stability | Image uniformity |
|---|---|---|---|---|---|---|
| 1-1 | 1-1 | 1-1 | AA | AA | A | C |
| 1-2 | 1-2 | 1-1 | AA | AA | A | C |
| 1-3 | 1-3 | 1-1 | AA | AA | A | C |
| 1-4 | 1-4 | 1-1 | AA | AA | A | C |
| 1-5 | 1-5 | 1-1 | AA | AA | A | C |
| 1-6 | 1-6 | 1-1 | AA | AA | A | C |
| 1-7 | 1-7 | 1-1 | AA | AA | A | C |
| 1-8 | 1-1 | 1-1 | AA | AA | A | A |
| 1-9 | 1-8 | 1-1 | AA | AA | A | C |
| 1-10 | 1-9 | 1-1 | AA | AA | A | C |
| 1-11 | 1-10 | 1-1 | AA | AA | A | C |
| 1-12 | 1-11 | 1-2 | AA | A | A | C |

TABLE 5-continued

| Example | Pigment dispersion element | Copolymer | Image density | Storage stability | Ejection stability | Image uniformity |
|---|---|---|---|---|---|---|
| 1-13 | 1-12 | 1-3 | AA | A | A | C |
| 1-14 | 1-13 | 1-4 | AA | AA | A | C |
| 1-15 | 1-14 | 1-5 | AA | AA | A | C |
| 1-16 | 1-15 | 1-6 | AA | AA | AA | C |
| 1-17 | 1-16 | 1-7 | AA | AA | AA | C |
| 1-18 | 1-17 | 1-8 | AA | AA | A | C |
| 1-19 | 1-17 | 1-8 | AA | AA | A | A |
| 1-20 | 1-18 | 1-8 | AA | AA | A | C |
| 1-21 | 1-19 | 1-8 | AA | AA | A | C |
| 1-22 | 1-20 | 1-8 | AA | AA | A | C |
| 1-23 | 1-21 | 1-9 | AA | A | B | C |
| 1-24 | 1-22 | 1-10 | AA | A | A | C |
| 1-25 | 1-23 | 1-11 | AA | A | A | C |
| 1-26 | 1-24 | 1-12 | AA | A | A | C |
| 1-27 | 1-25 | 1-13 | AA | A | A | C |
| 1-28 | 1-26 | 1-14 | A | B | B | C |
| 1-29 | 1-27 | 1-15 | A | B | B | C |
| 1-30 | 1-28 | 1-16 | A | B | B | C |
| 1-31 | 1-29 | 1-17 | A | B | B | C |
| 1-32 | 1-30 | 1-18 | B | B | B | C |
| 1-33 | 1-31 | 1-19 | B | B | B | C |
| 1-34 | 1-32 | 1-20 | B | B | B | C |
| 1-35 | 1-33 | 1-21 | B | B | B | C |
| 1-36 | 1-1 | 1-1 | B | A | B | C |
| 1-37 | 1-1 | 1-1 | A | A | B | C |
| 1-38 | 1-1 | 1-1 | A | A | B | C |
| 1-39 | 1-1 | 1-1 | A | A | B | C |
| 1-40 | 1-8 | 1-1 | A | A | B | C |
| 1-41 | 1-9 | 1-1 | A | A | B | C |
| 1-42 | 1-10 | 1-1 | A | A | B | C |
| 1-43 | 1-1 | 1-1 | AA | AA | A | A |
| 1-44 | 1-11 | 1-2 | AA | A | A | A |
| 1-45 | 1-12 | 1-3 | AA | A | A | A |
| 1-46 | 1-13 | 1-4 | AA | AA | A | A |
| 1-47 | 1-1 | 1-1 | AA | AA | A | B |
| 1-48 | 1-1 | 1-1 | AA | AA | A | B |
| 1-49 | 1-1 | 1-1 | AA | AA | A | B |
| 1-50 | 1-1 | 1-1 | AA | AA | A | B |

TABLE 6

| Example | Pigment dispersion element | Copolymer | Image density | Storage stability | Ejection stability | Image uniformity |
|---|---|---|---|---|---|---|
| 2-1 | 2-1 | 2-1 | AA | AA | A | C |
| 2-2 | 2-2 | 2-1 | AA | AA | A | C |
| 2-3 | 2-3 | 2-1 | AA | AA | A | C |
| 2-4 | 2-4 | 2-1 | AA | AA | A | C |
| 2-5 | 2-5 | 2-1 | AA | AA | A | C |
| 2-6 | 2-6 | 2-1 | AA | AA | A | C |
| 2-7 | 2-7 | 2-1 | AA | AA | A | C |
| 2-8 | 2-1 | 2-1 | AA | AA | A | A |
| 2-9 | 2-8 | 2-1 | AA | AA | A | C |
| 2-10 | 2-9 | 2-1 | AA | AA | A | C |
| 2-11 | 2-10 | 2-1 | AA | AA | A | C |
| 2-12 | 2-11 | 2-2 | AA | A | A | C |
| 2-13 | 2-12 | 2-3 | AA | A | A | C |
| 2-14 | 2-13 | 2-4 | AA | AA | A | C |
| 2-15 | 2-14 | 2-5 | AA | AA | A | C |
| 2-16 | 2-15 | 2-6 | AA | AA | AA | C |
| 2-17 | 2-16 | 2-7 | AA | AA | AA | C |
| 2-18 | 2-17 | 2-8 | AA | AA | A | C |
| 2-19 | 2-17 | 2-8 | AA | AA | A | A |
| 2-20 | 2-18 | 2-8 | AA | AA | A | C |
| 2-21 | 2-19 | 2-8 | AA | AA | A | C |
| 2-22 | 2-20 | 2-8 | AA | AA | A | C |
| 2-23 | 2-21 | 2-9 | AA | A | B | C |
| 2-24 | 2-22 | 2-10 | AA | A | A | C |
| 2-25 | 2-23 | 2-11 | AA | A | A | C |
| 2-26 | 2-24 | 2-12 | AA | A | A | C |
| 2-27 | 2-25 | 2-13 | AA | A | A | C |
| 2-28 | 2-26 | 2-14 | A | B | B | C |
| 2-29 | 2-27 | 2-15 | A | B | B | C |
| 2-30 | 2-28 | 2-16 | A | B | B | C |
| 2-31 | 2-29 | 2-17 | A | B | B | C |
| 2-32 | 2-30 | 2-18 | B | B | B | C |
| 2-33 | 2-31 | 2-19 | B | B | B | C |
| 2-34 | 2-32 | 2-20 | B | B | B | C |
| 2-35 | 2-33 | 2-21 | B | B | B | C |
| 2-36 | 2-1 | 2-1 | B | A | B | C |
| 2-37 | 2-1 | 2-1 | A | A | B | C |
| 2-38 | 2-1 | 2-1 | A | A | B | C |
| 2-39 | 2-1 | 2-1 | A | A | B | C |
| 2-40 | 2-8 | 2-1 | A | A | B | C |
| 2-41 | 2-9 | 2-1 | A | A | B | C |
| 2-42 | 2-10 | 2-1 | A | A | B | C |
| 2-43 | 2-1 | 2-1 | AA | AA | A | A |
| 2-44 | 2-11 | 2-2 | AA | A | A | A |
| 2-45 | 2-12 | 2-3 | AA | A | A | A |
| 2-46 | 2-13 | 2-4 | AA | AA | A | A |
| 2-47 | 2-1 | 2-1 | AA | AA | A | B |
| 2-48 | 2-1 | 2-1 | AA | AA | A | B |
| 2-49 | 2-1 | 2-1 | AA | AA | A | B |
| 2-50 | 2-1 | 2-1 | AA | AA | A | B |

TABLE 7

| Example | Pigment dispersion element | Copolymer | Image density | Storage stability | Ejection stability | Image uniformity |
|---|---|---|---|---|---|---|
| 3-1 | 3-1 | 3-1 | AA | AA | A | C |
| 3-2 | 3-2 | 3-1 | AA | AA | A | C |
| 3-3 | 3-3 | 3-1 | AA | AA | A | C |
| 3-4 | 3-4 | 3-1 | AA | AA | A | C |
| 3-5 | 3-5 | 3-1 | AA | AA | A | C |
| 3-6 | 3-6 | 3-1 | AA | AA | A | C |
| 3-7 | 3-7 | 3-1 | AA | AA | A | C |
| 3-8 | 3-1 | 3-1 | AA | AA | A | A |
| 3-9 | 3-8 | 3-1 | AA | AA | A | C |
| 3-10 | 3-9 | 3-1 | AA | AA | A | C |
| 3-11 | 3-10 | 3-1 | AA | AA | A | C |
| 3-12 | 3-11 | 3-2 | AA | A | A | C |
| 3-13 | 3-12 | 3-3 | AA | A | A | C |
| 3-14 | 3-13 | 3-4 | AA | AA | A | C |
| 3-15 | 3-14 | 3-5 | AA | AA | A | C |
| 3-16 | 3-15 | 3-6 | AA | AA | AA | C |
| 3-17 | 3-16 | 3-7 | AA | AA | AA | C |
| 3-18 | 3-17 | 3-8 | AA | AA | A | C |
| 3-19 | 3-17 | 3-8 | AA | AA | A | A |
| 3-20 | 3-18 | 3-8 | AA | AA | A | C |
| 3-21 | 3-19 | 3-8 | AA | AA | A | C |
| 3-22 | 3-20 | 3-8 | AA | AA | A | C |
| 3-23 | 3-21 | 3-9 | AA | A | B | C |
| 3-24 | 3-22 | 3-10 | AA | A | A | C |
| 3-25 | 3-23 | 3-11 | AA | A | A | C |
| 3-26 | 3-24 | 3-12 | AA | A | A | C |
| 3-27 | 3-25 | 3-13 | AA | A | A | C |
| 3-28 | 3-26 | 3-14 | A | B | B | C |
| 3-29 | 3-27 | 3-15 | A | B | B | C |
| 3-30 | 3-28 | 3-16 | A | B | B | C |
| 3-31 | 3-29 | 3-17 | A | B | B | C |
| 3-32 | 3-30 | 3-18 | B | B | B | C |
| 3-33 | 3-31 | 3-19 | B | B | B | C |
| 3-34 | 3-32 | 3-20 | B | B | B | C |
| 3-35 | 3-33 | 3-21 | B | B | B | C |
| 3-36 | 3-1 | 3-1 | B | A | B | C |
| 3-37 | 3-1 | 3-1 | A | A | B | C |
| 3-38 | 3-1 | 3-1 | A | A | B | C |
| 3-39 | 3-1 | 3-1 | A | A | B | C |
| 3-40 | 3-8 | 3-1 | A | A | B | C |
| 3-41 | 3-9 | 3-1 | A | A | B | C |
| 3-42 | 3-10 | 3-1 | A | A | B | C |
| 3-43 | 3-1 | 3-1 | AA | AA | A | A |
| 3-44 | 3-11 | 3-2 | AA | A | A | A |

TABLE 7-continued

| Example | Pigment dispersion element | Copolymer | Image density | Storage stability | Ejection stability | Image uniformity |
|---|---|---|---|---|---|---|
| 3-45 | 3-12 | 3-3 | AA | A | A | A |
| 3-46 | 3-13 | 3-4 | AA | AA | A | A |
| 3-47 | 3-1 | 3-1 | AA | AA | A | B |
| 3-48 | 3-1 | 3-1 | AA | AA | A | B |
| 3-49 | 3-1 | 3-1 | AA | AA | A | B |
| 3-50 | 3-1 | 3-1 | AA | AA | A | B |

TABLE 8

| Comparative Example | Pigment dispersion element | Copolymer | Image density | Storage stability | Ejection stability | Image uniformity |
|---|---|---|---|---|---|---|
| 1 | 4-1 | 4-1 | D | D | D | E |
| 2 | 4-2 | 4-1 | D | D | D | E |
| 3 | 4-3 | 4-1 | D | D | D | E |
| 4 | 4-4 | 4-1 | D | D | D | E |
| 5 | 4-5 | 4-2 | C | D | D | E |
| 6 | 4-6 | 4-3 | D | C | D | E |
| 7 | 4-7 | 4-4 | D | C | D | E |
| 8 | 4-8 | 4-5 | D | C | D | D |
| 9 | 4-9 | 1-1 | C | C | C | D |
| 10 | 4-10 | 2-1 | C | C | C | D |
| 11 | 4-11 | 3-1 | C | C | C | E |
| 12 | 4-12 | 4-1 | D | C | D | E |
| 13 | 4-13 | 4-2 | D | C | D | E |
| 14 | 4-14 | 4-3 | D | C | D | E |
| 15 | 4-15 | 4-4 | D | C | D | E |
| 16 | 4-16 | 4-5 | D | C | D | E |
| 17 | 4-5 | 4-2 | D | D | D | E |
| 18 | 4-9 | 1-1 | D | D | D | E |

As seen in Tables 5 to 7, the inkjet inks of Examples have excellent image density, storage stability, and ejection stability.

As seen in Table 8, since the inkjet inks of Comparative Examples 1 to 4 contain Copolymer 4-1 having no structure unit represented by Chemical formula 1 or no structure unit represented by Chemical formula 2, 3, or 4 and no polyvinyl pyrolidone, the image density, storage stability, and ejection stability are inferior.

Since the inkjet inks of Comparative Examples 5 and 17 contain Copolymer 4-2 having no structure unit represented by Chemical formula 2, 3, or 4 and no polyvinyl pyrolidone, the image density, storage stability, and ejection stability are inferior.

Since the inkjet inks of Comparative Examples 6 to 8 contain Copolymers 4-3 to 4-5 having no structure unit represented by Chemical formula 1 and no polyvinyl pyrolidone, the image density, storage stability, and ejection stability are inferior.

Since the inkjet inks of Comparative Examples 9 to 11 and 18 contain no polyvinyl pyrolidone, the image density, storage stability, and ejection stability are inferior.

Since the inkjet inks of Comparative Examples 12 contains Copolymer 4-1 having no structure unit represented by Chemical formula 1 or no structure unit represented by Chemical formula 2, 3, or 4, the image density, storage stability, and ejection stability are inferior.

Since the inkjet inks of Comparative Examples 13 contains Copolymer 4-2 having no structure unit represented by Chemical formula 2, 3, or 4, the image density, storage stability, and ejection stability are inferior.

Since the inkjet inks of Comparative Examples 14 to 16 contain Copolymers 4-3 to 4-5 having no structure unit represented by Chemical formula 1, the image density, storage stability, and ejection stability are inferior.

According to the present disclosure, an inkjet ink is provided which has high image density on plain paper, storage stability, and ejection stability.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet ink, comprising:

water;

a hydrosoluble organic solvent;

a pigment;

polyvinyl pyrrolidone; and a copolymer, wherein:

the copolymer comprises a structure unit represented by formula (1) and at least one selected from the group consisting of a structural unit of formula (2), a structural unit of formula (3) and a structural unit of formula (4);

the structure unit represented by formula (1) is:

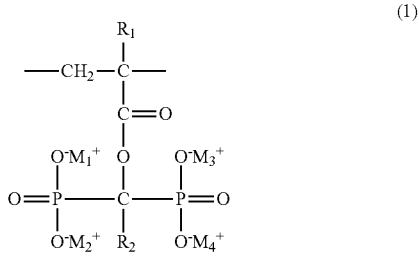

(1)

where $R_1$ represents a hydrogen atom or a methyl group, $R_2$ is an alkyl group having one to four carbon atoms, $M_1^+$, $M_2^+$, $M_3^+$ and $M_4^+$ each, independently represent protons, alkali metal ions, or organic ammonium ions;

the structure unit represented by formula (2) is:

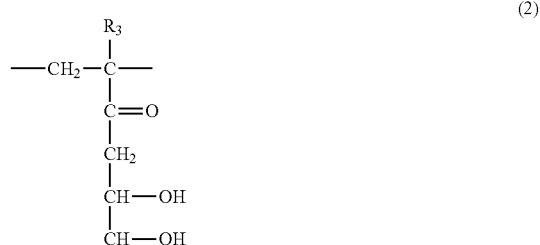

(2)

where $R_3$ represents a hydrogen atom or a methyl group;

the structure unit represented by formula (3) is:

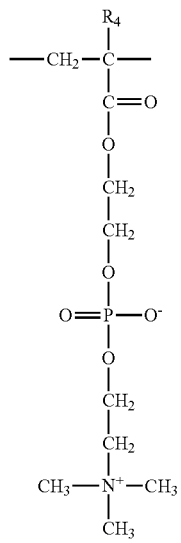

(3)

where $R_4$ represents a hydrogen atom or a methyl group; and the structure unit represented by formula (4) is:

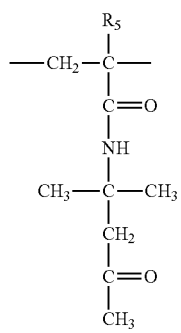

(4)

where $R_5$ represents a hydrogen atom or a methyl group.

2. The inkjet ink according to claim 1, wherein the copolymer comprises the structure unit represented by formula (1) in an amount of from 10% by weight to 60% by weight.

3. The inkjet ink according to claim 1, wherein the copolymer comprises the structure unit represented by formula (4) and $R_5$ is a hydrogen bond.

4. The inkjet ink according to claim 1, wherein the copolymer is synthesized by copolymerizing at least monomers of a compound represented by formula (5) and at least one selected from the group consisting of a compound represented by formula (6), a compound represented by formula (7) and a compound represented by formula (8); wherein:

the compound represented by formula (5) is:

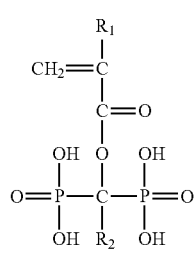

(5)

where
$R_1$ represents a hydrogen atom or a methyl group and
$R_2$ is an alkyl group having one to four carbon atoms;

the compound represented by formula (6) is:

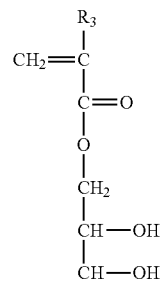

(6)

where $R_3$ represents a hydrogen atom or a methyl group;

the compound represented by formula (7) is:

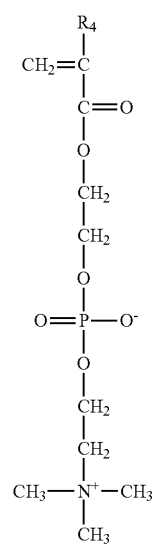

(7)

where $R_4$ represents a hydrogen atom or a methyl group; and the compound represented by formula (8) is:

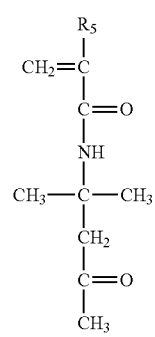

(8)

where $R_5$ represents a hydrogen atom or a methyl group.

5. The inkjet ink according to claim 1, wherein 10% by weight aqueous solution of the copolymer has a viscosity of from 1.5 mPa·s to 30.0 mPa·s at 25° C.

6. The inkjet ink according to claim 1, wherein $M_1^+$, $M_2^+$, $M_3^+$, and $M_4^+$ are organic ammonium ions.

7. The inkjet ink according to claim 1, further comprising resin particulates having a volume median diameter D50 of from 70 nm to 250 nm.

8. A method of manufacturing an inkjet ink, the method comprising:
    adjusting a pigment dispersion element in which a pigment is dispersed in water; and
    manufacturing the inkjet ink of claim 1 using the pigment dispersion element

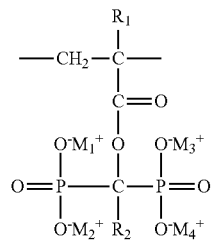

9. An ink cartridge, comprising:
    a container; and
    the inkjet ink of claim 1 that is accommodated in the container.

10. An inkjet recording device, comprising:
    an ejection device to eject the inkjet ink of claim 1.

* * * * *